(12) United States Patent
Furuya et al.

(10) Patent No.: US 7,675,950 B2
(45) Date of Patent: Mar. 9, 2010

(54) LASER LIGHT SOURCE DEVICE AND IMAGE DISPLAY APPARATUS

(75) Inventors: Hiroyuki Furuya, Nara (JP); Kiminori Mizuuchi, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 122 days.

(21) Appl. No.: 12/096,161

(22) PCT Filed: Dec. 5, 2006

(86) PCT No.: PCT/JP2006/324229
§ 371 (c)(1),
(2), (4) Date: Jun. 4, 2008

(87) PCT Pub. No.: WO2007/066641
PCT Pub. Date: Jun. 14, 2007

(65) Prior Publication Data
US 2009/0161701 A1    Jun. 25, 2009

(30) Foreign Application Priority Data
Dec. 5, 2005    (JP) .......................... 2005-350352

(51) Int. Cl.
*H01S 3/30* (2006.01)
(52) U.S. Cl. .................. 372/6; 372/21; 372/22; 372/69; 372/102
(58) Field of Classification Search .............. 372/6, 372/21, 22, 69
See application file for complete search history.

(56) References Cited

U.S. PATENT DOCUMENTS 6,201,636 B1    3/2001  Noda
6,301,271 B1 *  10/2001 Sanders et al. ............... 372/3
6,845,194 B2    1/2005  Ramachandran
6,980,578 B2    12/2005 Ramachandran
2003/0002794 A1  1/2003 Ramachandran (Continued)

FOREIGN PATENT DOCUMENTS

JP          8-250790        9/1996

(Continued)

OTHER PUBLICATIONS

International Search Report issued Feb. 6, 2007 in International (PCT) Application No. PCT/JP2006/324229.

(Continued)

*Primary Examiner*—Dung T Nguyen
(74) *Attorney, Agent, or Firm*—Wenderoth, Lind & Ponack, L.L.P.

(57) ABSTRACT

There has been a problem that pumping light leaks from a part having a coating at the joint of a double-clad fiber added with a rare earth and a general single-mode fiber, and heat is generated partly from the fiber by this energy thus causing deterioration of the fiber. Deterioration of a fiber due to residual excitation light can be prevented by preventing residual excitation light in a double-clad fiber from exiting to a single-mode fiber, and the reliability is enhanced. Output of oscillation light can be increased because output of excitation light is not limited. Furthermore, a laser display having a high color reproducibility can be achieved by employing a light source combining a fiber laser light source and a wavelength conversion module.

22 Claims, 18 Drawing Sheets

U.S. PATENT DOCUMENTS

2004/0233941 A1* 11/2004 Fajardo et al. ................ 372/6
2005/0100280 A1   5/2005 Ramachandran

FOREIGN PATENT DOCUMENTS

| JP | 11-121836   |   | 4/1999  |
| -- | ----------- | - | ------- |
| JP | 11121836    | * | 4/1999  |
| JP | 11-195827   |   | 7/1999  |
| JP | 3012034     |   | 12/1999 |
| JP | 2000-341213 |   | 12/2000 |
| JP | 2001-148527 |   | 5/2001  |
| JP | 2003-86868  |   | 3/2003  |
| JP | 2003-90918  |   | 3/2003  |
| JP | 2003-139962 |   | 5/2003  |
| JP | 2003-258341 |   | 9/2003  |
| JP | 2004-147201 |   | 5/2004  |
| JP | 2005-12008  |   | 1/2005  |
| JP | 2005-93817  |   | 4/2005  |
| JP | 2005-129863 |   | 5/2005  |
| JP | 2005-174982 |   | 6/2005  |
| JP | 2005-294570 |   | 10/2005 |

OTHER PUBLICATIONS

Ken'ichi Kasazumi et al., "A Practical Laser Projector with New Illumination Optics for Reduction of Speckle Noise", Japanese Journal of Applied Physics, vol. 43, No. 8B, 2004, pp. 5904-5906.

"Rare-earth-doped Fiber lasers and amplifier", Marcel Dekker, Inc., 2001, pp. 144-149.

* cited by examiner

LASER LIGHT SOURCE DEVICE AND IMAGE DISPLAY APPARATUS

TECHNICAL FIELD

The present invention relates to a laser light source device which is capable of attaining a stable high output, and an image display apparatus provided with this laser light source device.

BACKGROUND ART

In recent years, a fiber laser light source has received much attention as a near infrared laser light source, instead of a conventional solid state laser light source. This is because the fiber laser light source has a high oscillation efficiency and an excellent beam quality, and further, can be cooled with air and has a simple structure.

FIG. 13 is a schematic diagram showing a configuration of a typical fiber laser light source. Laser light emitted from an exciting (pumping) LD (laser diode) 101 is incident upon a rare-earth-doped clad pumping fiber 103 as a laser medium. Then, it is resonated in a laser resonator made up of fiber gratings 102 and 104 as a reflecting mirror and thereby oscillated.

A polarizer 105 is inserted for unifying the polarization directions of the oscillated laser light.

This fiber laser light source has an excellent beam quality and can regulate an oscillation wavelength spectrum with the line width of a reflection spectrum in the fiber grating 104 on the exit side. Hence, the fiber laser light source as a fundamental wave light source is extremely suitable for harmonic generation (called a wavelength conversion light source) provided with a non-linear optical crystal.

A second-harmonic generation (SHG) module 108 shown in FIG. 13 is a mechanism for conducting second harmonic generation. This mechanism contributes to emitting a twofold second harmonic 107 at last.

Furthermore, a laser crystal provided in a conventional solid state laser regulates a laser oscillation wavelength. In contrast, the set of fiber gratings 102 and 104 regulate an oscillation wavelength as well in this fiber laser. In other words, they can vary an oscillation wavelength arbitrarily, though its gain differs according to the wavelength.

On the other hand, a laser display has been widely known as the application of such laser light harmonic to a light source (wavelength conversion light source) (Non-patent Document 1).

Comparing to conventional use of a white lamp, unnecessary infrared rays or ultraviolet rays are less generated, thus keeping the power consumption low. Further, a more efficient light concentration is feasible using laser light, thereby enhancing the light utilization efficiency.

Moreover, compared to the case of a light emitting diode, laser light is monochromatic light and higher in color purity. This helps improve the color reproducibility of a display apparatus. Particularly, deeper green can be displayed by setting the wavelength of green light to 520 to 535 nm.

FIG. 14 shows a color reproduction range of used green light according to a wavelength in the case of blue light having a wavelength of 460 nm and red light having a wavelength of 635 nm on a chromaticity diagram. With respect to wavelengths, a solid state laser can generate only two wavelengths, i.e., a wavelength of 532 nm in the case of using Nd:YAG, Nd:YVO$_4$ or the like, and a wavelength of 527 nm in the case of using Nd:YLF. Particularly, YLF is a fluoride crystal and hard to produce. This makes promising a fiber laser having a broad fluorescence spectrum and capable of selecting an oscillation wavelength freely (Non-patent Document 2).

In a fiber laser or a fiber amplifier, excitation light and oscillation light propagate through the same fiber. As mentioned with reference to Patent Document 1, a part of oscillation light turns into undesirable return light, which may damage an excitation light source. For this reason, use of a lens system and a mirror as shown in FIG. 15 has been studied to eliminate such oscillation light.

It is preferable that the wavelength of a green light source for a laser display apparatus is 530 to 520 nm from the viewpoint of a color reproduction range. However, in the use of a wavelength conversion light source provided with a fiber laser as a fundamental wave light source, light having a wavelength of 1075 nm or less as a fundamental wave within the above-mentioned wavelength range is absorbed into a rare-earth-added fiber as a laser medium. This makes the oscillation operation of a laser resonator unstable. Consequently, the length of a fiber as an interaction length cannot be made greater. This phenomenon is conspicuous in a polarization maintaining fiber such as a PANDA (polarization-maintaining and absorption-reducing) fiber used for attaining a linear polarization necessary to a wavelength conversion light source.

Also, excitation light must be increased to raise the output of laser light. However, depending upon the wavelength of excitation light, excitation light which is absorbed in a rare-earth-added fiber as a laser medium may deteriorate the fiber. FIG. 16 shows a mechanism of such deterioration.

FIG. 16 shows a fusion joint 410 of a double-clad polarization maintaining fiber added with a rare earth and a usual single-mode polarization maintaining fiber. In the double-clad polarization maintaining fiber, residual excitation light 408 is confined in an outer clad 402. In this state, light propagates in an inner clad 403.

On the other hand, in the portion of the connected single-mode polarization maintaining fiber where a coating 407 is removed, air works as a clad, consequently confining residual excitation light 408. However, pumping light leaks from the portion having the coating 407 and its energy generates heat in a part of the single-mode polarization maintaining fiber, e.g., a heat generated part 409. This causes deterioration of the fiber.

For example, in the case where excitation light has 10 W, the absorption of the double-clad polarization maintaining fiber added with a rare earth Yb is 0.6 dB/m. Hence, it will be seen that a fiber having a length of 10 m absorbs excitation light of 7.5 W. Consequently, light having 2.5 W and 915 nm is radiated as residual excitation light and propagated through the clad of the single-mode polarization maintaining fiber.

In the case of the conventional configuration shown in FIG. 13, pumping is conducted with excitation light (915 nm) of 15 W and the output of oscillation light (1064 nm) is 6.8 W. In this case, twenty minutes after a continuous operation, a fusion joint 110 and a primary coat (coating) of a single-mode polarization maintaining fiber 112 were overheated, thus causing deterioration of the fiber.

FIG. 17 is a plotting graph showing a relationship between the fiber length of a Yb-doped double-clad fiber as a laser medium and residual excitation light, using the power of excitation light as a parameter. Some conventional examinations prove that the fiber is deteriorated when the residual excitation light exceeds 3.5 to 4 W. As can be seen from FIG. 17, the excitation light power needs to be made smaller if the fiber length has to be shortened because of a loss possessed by the fiber. In other words, at a wavelength of 1050 nm or 1030 nm at which the fiber has a great loss, an output to be generated is inevitably limited.

In the case of generating oscillation light having a wavelength of 1070 nm or more, which is not absorbed by a fiber, the rare-earth-added double-clad polarization maintaining fiber can be prevented from being overheated by increasing the length thereof. However, at a wavelength of 1060 nm, 1050 nm or the like where green color can be produced by a wavelength conversion, the problems have been known that the loss which is caused by absorption of a fiber increases as the length of a rare-earth-added double-clad polarization maintaining fiber increases, the oscillation becomes unstable, the oscillation cannot be performed at a desired wavelength. Therefore, the intensity of excitation light is obviously determined to keep a fiber from being overheated, thus limiting the maximum output.

FIG. 18 shows an absorption spectrum of a rare-earth-added double-clad fiber which is added with Yb as a rare earth at approximately 1000 ppm as an example of solving these problems.

A laser diode (LD) around 915 nm or a laser diode around 976 nm can be used as excitation light. The fiber absorbs the light of 915 nm at some 0.6 dB/m while it absorbs the light of 976 nm at some 1.8 dB/m. The latter is about three times as great as the former. Thus, it will be seen that the use of the light of 976 nm solves the deterioration of the fiber.

However, the profile of the absorption peak at 976 nm is steep while the profile of the absorption peak at 915 nm is broad. Hence, the 915-nm band (900 to 950 nm) is more stable against a variation in the wavelength of excitation light which is likely to be caused by a change in the temperature of an excitation light LD or the like. This helps simplify a cooling mechanism for the LD, which thus reduces the cost and power consumption of such an apparatus. Hence, it has been conventionally difficult to attain both the temperature stabilization of a fiber laser device and generation of light having a linear polarization, 6 W or more, and 1075 nm or less using a fiber laser device.

Patent Document 1: Japanese Patent No. 3012034
Non-patent Document 1: Japanese Journal of Applied Physics Vol. 43, No. 8B, 2004, pp. 5904-5906
Non-patent Document 2: Rare-earth-doped Fiber lasers and amplifiers, (Marcel Dekker, Inc., 2001), p. 145, FIG. 10

DISCLOSURE OF THE INVENTION

It is an object of the present invention to provide a laser light source device which has a high reliability against deterioration of a fiber due to residual excitation light, and increase the output of oscillation light.

A laser light source device according to an aspect of the present invention comprises: a double-clad fiber added with a rare earth as a laser active material; a laser light source for emitting excitation light to the double-clad fiber to excite the double-clad fiber; a set of fiber gratings for determining a wavelength of oscillation light in the double-clad fiber; a single-mode fiber for propagating oscillation light in the double-clad fiber; and a wavelength conversion module for converting oscillation light in the double-clad fiber into a harmonic, wherein residual excitation light in the double-clad fiber into which the excitation light has been allowed to fall from the laser light source is prevented from exiting to the single-mode fiber.

According to the present invention, residual excitation light in the double-clad fiber into which the excitation light has been allowed to fall from the laser light source is prevented from exiting to the single-mode fiber. This makes it possible to prevent the fiber deterioration which is likely to be caused when light of a high output is generated. Accordingly, an image display apparatus which is provided with a laser light source device according to the present invention can have a color reproduction range wider than apparatuses provided with the conventional solid state laser.

As excitation light, further, this device can use light having a band of 915 nm, which provide a broader absorption spectrum for a rare-earth fiber. Hence, there is no need to control the temperature for excitation precisely, which can thus eliminate a Peltier element and reduce the power consumption.

Moreover, a laser light source device according to the present invention has a high efficiency to thereby decrease the power consumption further.

BEST MODE FOR CARRYING OUT THE INVENTION

Figure 1:
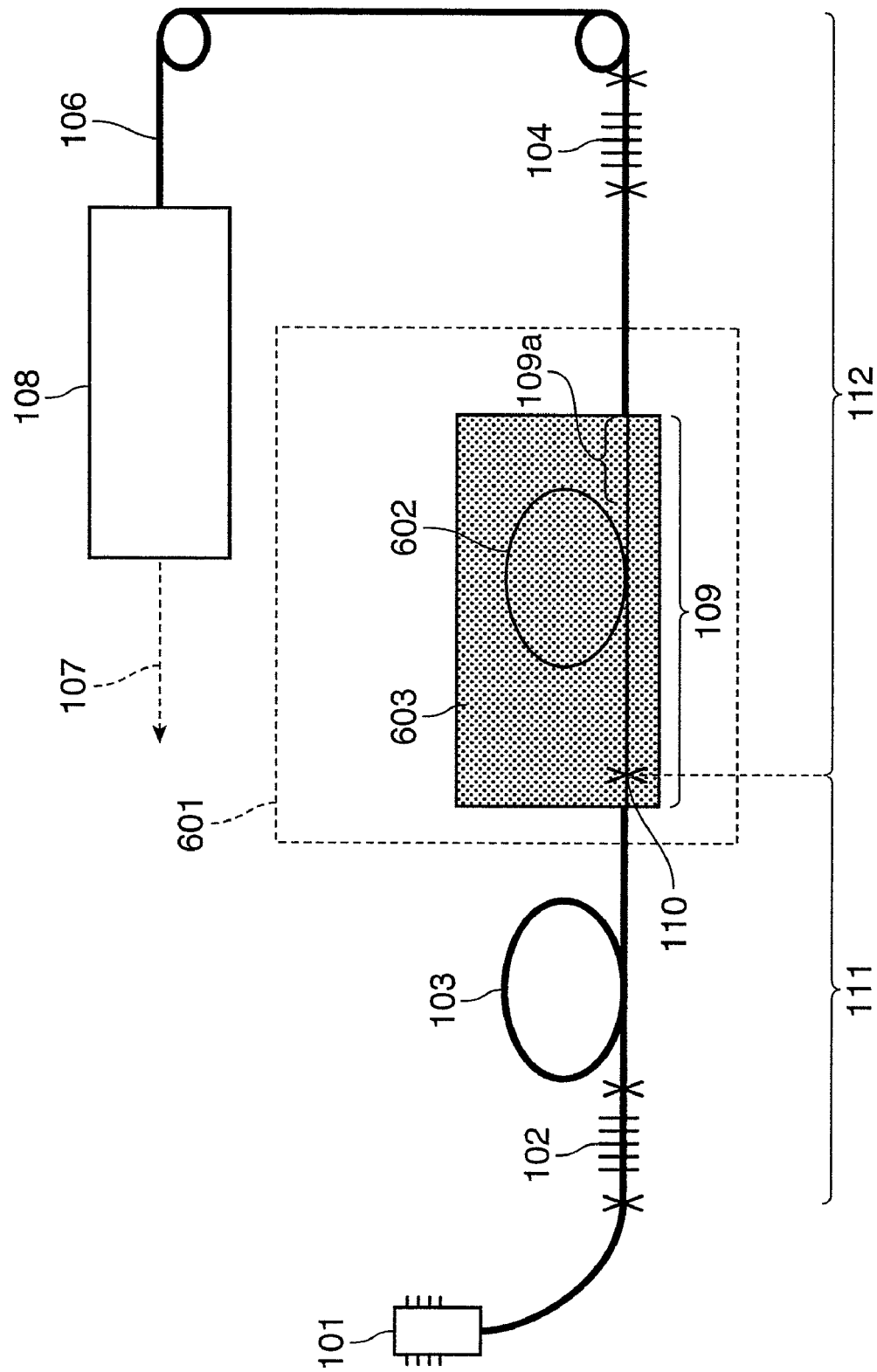
FIG. 1 is a schematic diagram showing a configuration of a fiber laser light source according to a first embodiment of the present invention.

Embodiments of the present invention will be below described with reference to the drawings. Like components are given the same reference character, and description of the component given the same character is omitted.

First Embodiment

A first embodiment of the present invention offers a residual excitation light radiating-and-absorbing mechanism utilizing a loss which is caused due to a curvature of a fiber.

FIG. 1 shows a configuration of a laser light source device according to the first embodiment. In FIG. 1, the laser light source device of this embodiment includes: a pumping LD (Laser Diode) 101; a fiber grating 102; a Yb-doped double-clad polarization maintaining fiber 103; a fiber grating 104; and a residual excitation light radiating-and-absorbing mechanism (pumping light radiating-and-absorbing mechanism) 601. The laser light source device according to this embodiment is connected to a second-harmonic generation (SHG) module 108 via an oscillation light propagation fiber 106.

The pumping LD 101 excites the double-clad polarization maintaining fiber 103 (in this embodiment, fiber length: 10 m) doped with Yb as a rare earth on a core part of a double-clad polarization maintaining fiber 111. Then, laser light is oscillated inside of a resonator made up of the set of fiber gratings 102 and 104. In this embodiment, a single emitter laser diode (maximum output: 10 W) having an oscillation wavelength of 915 nm is used as the pumping LD 101.

The fiber grating 102 is formed by adding germanium to the core part of the double-clad polarization maintaining fiber 111 in such a way that it is more sensitive to ultraviolet light. The fiber grating 102 has the property of a center wavelength of 1064.0 nm, a reflection spectrum half-value width of 1 nm and a reflectance of 98%.

The fiber grating 104 is formed, in the same way, by adding germanium to a core part of a general single-mode polarization maintaining fiber (core diameter: 6 μm and clad outer diameter: 125 μm) 112. It has a center wavelength of 1064.1 nm, a reflection spectrum half-value width of 0.09 nm and a reflectance of 10%. Increasing of the reflectance of the fiber grating 104 can make the rare-earth-added double-clad polarization maintaining fiber 103 longer to thereby absorb more residual excitation light. However, this is not necessarily thought to be an effective measure because of some limit to an improvement in the characteristics. Besides, the narrow band is important for the purpose of a wavelength conversion, but increasing the reflectance of the fiber grating 104 makes it hard to attain the narrow band by the fiber grating 104.

The oscillation light having around 1064 nm propagates into the SHG module 108 through the oscillation light propagation fiber 106 to thereby generate light having 532 nm by second-harmonic generation.

Next, a description will be given about the residual excitation light radiating-and-absorbing mechanism 601 of the laser light source device according to this embodiment.

As shown in FIG. 1, a joint (fusion joint) 110 of the double-clad polarization maintaining fiber 111 and the single-mode polarization maintaining fiber 112 lies between the Yb-doped double-clad polarization maintaining fiber 103 and the fiber grating 104. This joint 110 is liable to cause the fiber to deteriorate. Thus, the residual excitation light radiating-and-absorbing mechanism 601 is disposed in this embodiment.

The residual excitation light radiating-and-absorbing mechanism 601 is realized by removing a primary coat (resin coating) of the single-mode polarization maintaining fiber 112 by approximately 10 cm and forming this removed part into a coil-shaped portion 602 having a diameter of about 30 mm. A residual fundamental wave (wavelength: 915 nm) propagating through the clad part of the single-mode polarization maintaining fiber 112 is radiated through the coil-shaped portion 602.

For example, if excitation light is 10 W, the absorption of the double-clad polarization maintaining fiber 103 doped with Yb as a rare earth is 0.6 dB/m. Hence, it absorbs excitation light of 7.5 W in the fiber length of 10 m. Thereby, light having 2.5 W and 915 nm as residual excitation light is radiated through the coil-shaped portion 602 and propagated through the clad of the single-mode polarization maintaining fiber 112.

Herein, the coil-shaped portion 602 of the single-mode polarization maintaining fiber 112 is fixedly attached to an absorption plate 603. This absorption plate 603 absorbs infrared light radiated from the coil-shaped portion 602 and converts it into heat. The absorption plate 603 is provided with an alumite-treated aluminum sheet.

Figure 13:
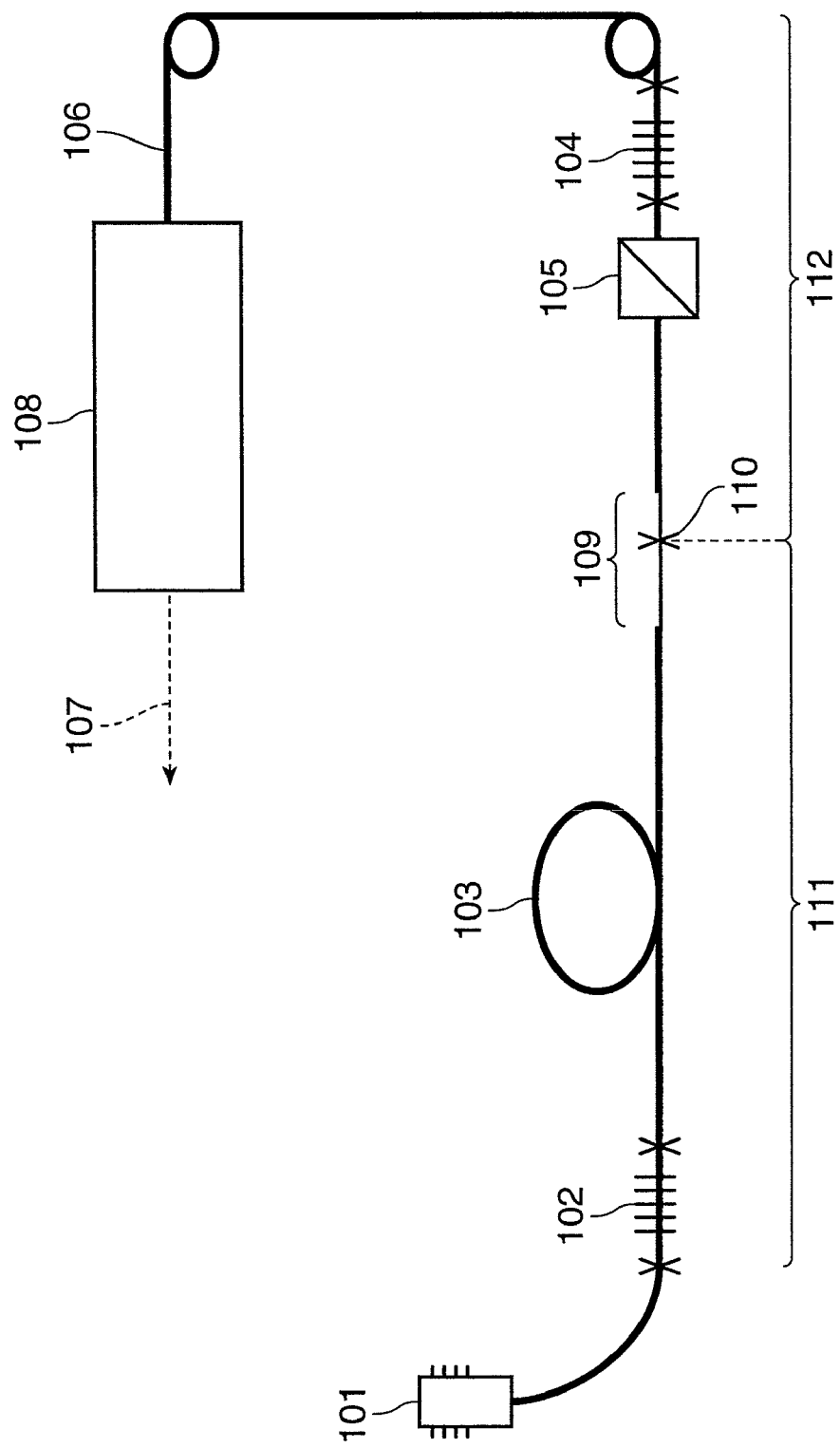
FIG. 13 is a schematic diagram showing a configuration of a fiber laser light source combined with a conventional second-harmonic generator.
Figure 14:
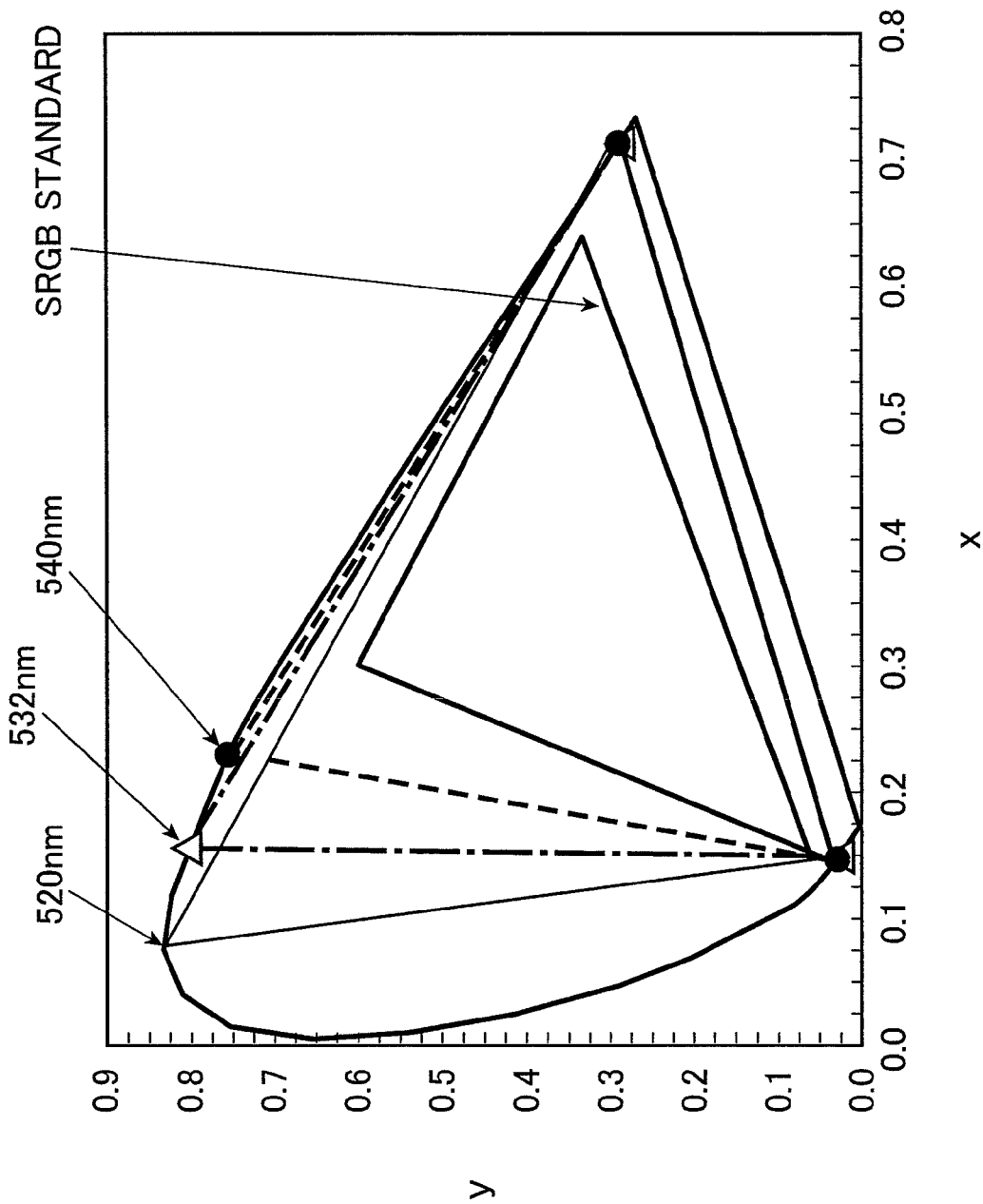
FIG. 14 is a chromaticity diagram showing a relationship between a color reproduction range of the S-RGB standard and a color reproduction range of each of wavelengths for green light.
Figure 15:
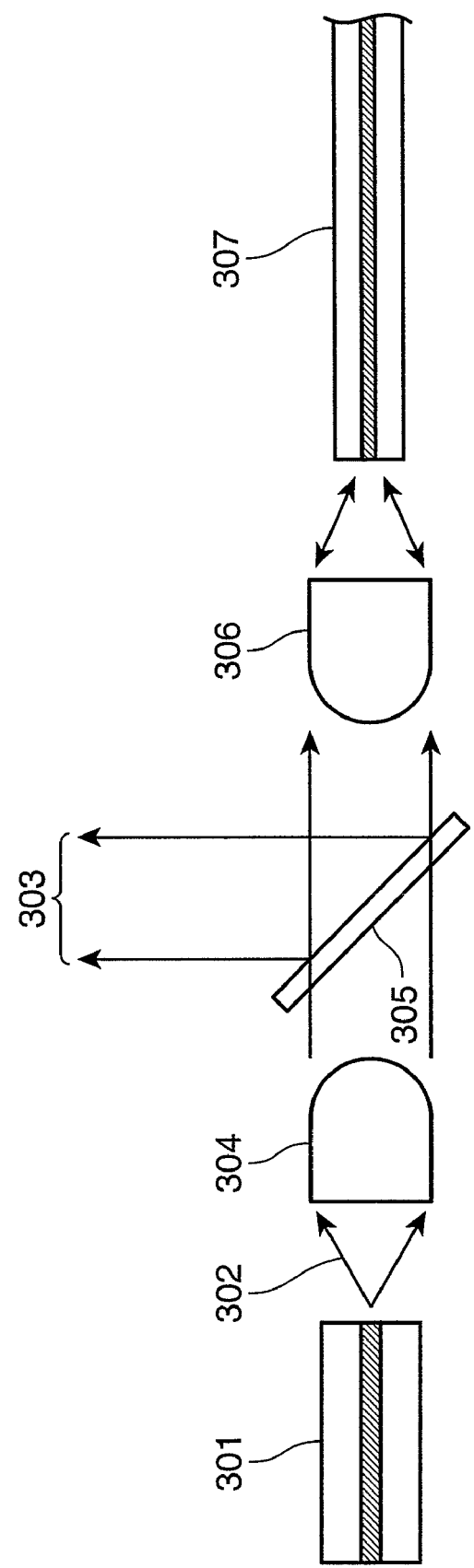
FIG. 15 is a schematic diagram showing how to extract oscillation light in a conventional optical fiber amplifier.
Figure 16:
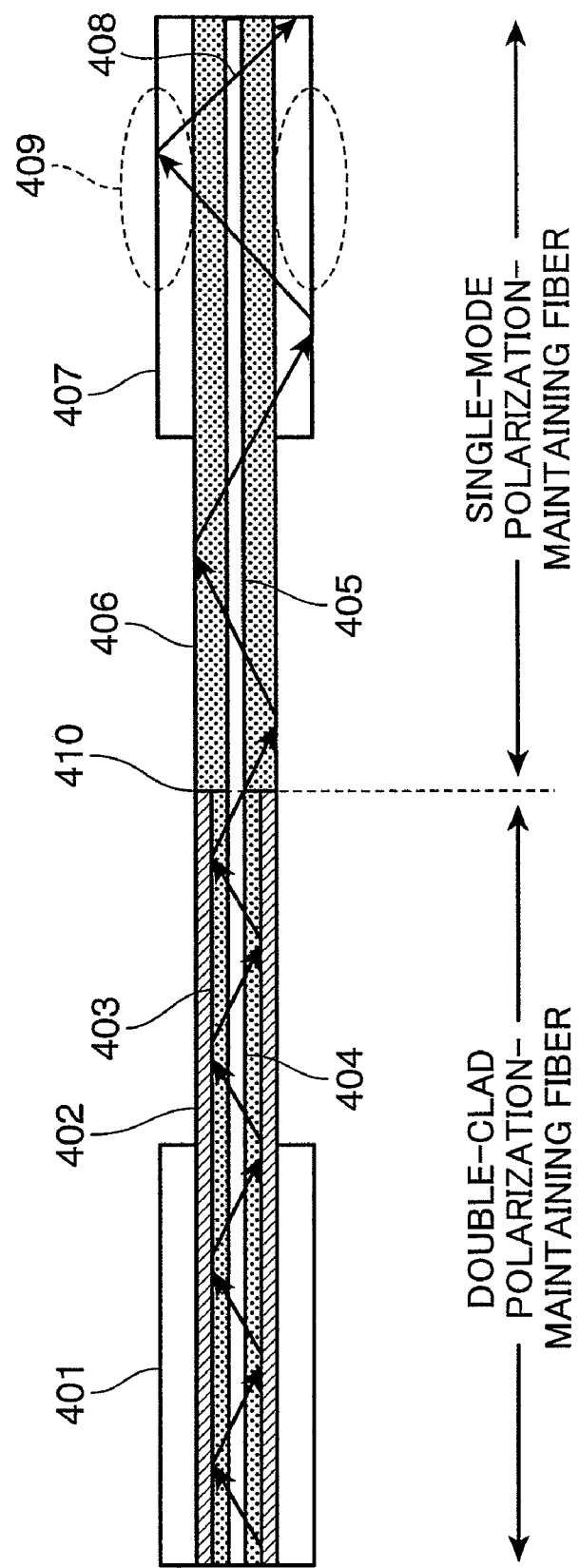
FIG. 16 is a schematic diagram showing a joint of a double-clad polarization maintaining fiber and a single-mode polarization maintaining fiber.

In the case of the conventional configuration shown in FIG. 13 where pumping is conducted with excitation light (915 nm) of 15 W and the output of oscillation light of 1064 nm is 6.8 W, in the elapse of twenty minutes after a continuous operation, the joint (fusion joint) 110 shown in FIG. 13 and the primary coat (coating) of the single-mode polarization maintaining fiber 112 overheated, thus causing deterioration of the fiber 112. In the laser light source device according to this embodiment, however, no overheating occurred in the coating even after continuous operation was performed for twenty or more hours. It was confirmed that the reliability can be raised.

In addition, excitation light having a greater power can be pumped to thereby increase the output of light of 1064 nm, as well as raise the output of green light which is obtained by performing wavelength conversion of the light.

In this embodiment, in order to increase the radiation efficiency of the coil-shaped portion 602, it is preferable that the diameter of the core of the single-mode polarization maintaining fiber 112 which constitutes the coil-shaped portion 602 of the residual excitation light radiating-and-absorbing mechanism 601 is 4.5 to 5.5 μm; the diameter of the coil-shaped portion 602 is 35 to 70 mm; and the turn number of the coil-shaped portion 602 is five or more.

Furthermore, if the diameter of the core of the single-mode polarization maintaining fiber 112 which constitutes the coil-shaped portion 602 of the residual excitation light radiating-and-absorbing mechanism 601 is too small, there is the likelihood that the loss of the light of 1064 nm rises and the fiber strand (without primary coat) deteriorates. Hence, the core diameter is preferably 20 mm or larger. On the other hand, if it is 40 mm or greater, the radiation of the residual fundamental wave becomes smaller. Accordingly, the core diameter is preferably approximately 20 to 40 mm.

Moreover, in this embodiment, it is preferable that a coat-removed portion 109 of the residual excitation light radiating-and-absorbing mechanism 601 is provided in the straight part from the joint 110 up to the coil-shaped portion 602 and the coil-shaped portion 602. It is more preferable to provide a coat-removed portion in a straight part 109a from the coil-shaped portion 602 extending toward the fiber grating 104.

Second Embodiment

Next, a description will be given about a configuration of a laser light source device according to a second embodiment of the present invention. In this embodiment, a fiber strand is placed in a high refractive material.

Figure 2:
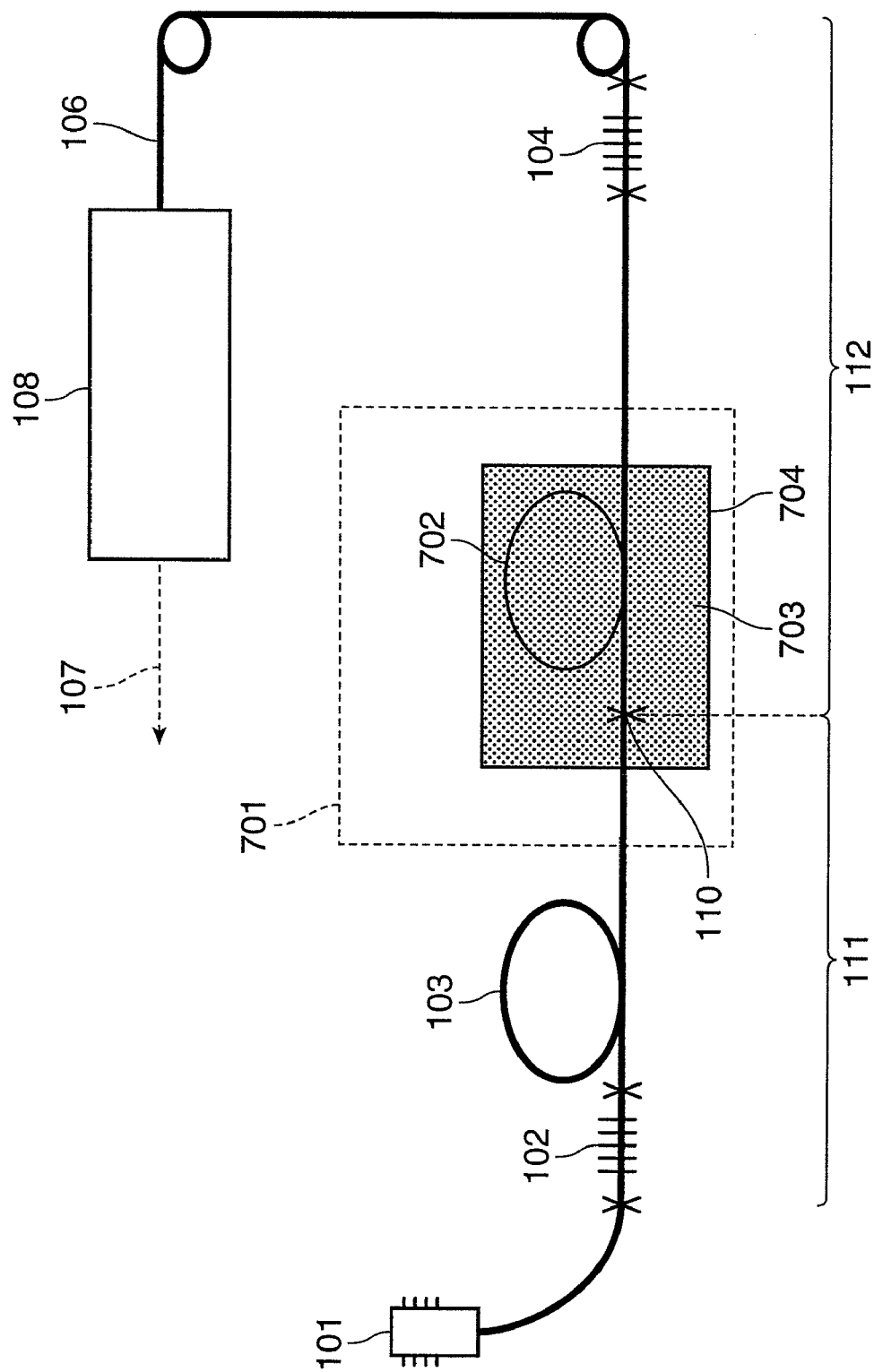
FIG. 2 is a schematic diagram showing a configuration of a fiber laser light source according to a second embodiment of the present invention.

FIG. 2 shows a configuration of a laser light source device according to the second embodiment. In the above described first embodiment, the coil-shaped portion 602 is placed in air having a refractive index of 1, and the coat removed portion 109 including the coil-shaped portion 602 of the single-mode polarization maintaining fiber 112 functions as a multi-mode fiber for excitation light. Then, the bending curvature of the coil-shaped portion 602 is made greater to thereby radiate unnecessary excitation light.

However, the difference in refractive index between the clad of the single-mode polarization maintaining fiber 112 and the air is approximately 1.4. To increase the radiation efficiency of excitation light further, accordingly, the refractive index difference needs to be decreased.

In this embodiment, therefore, a material 703 having a refractive index of 1.5 or more covers a coil-shaped portion 702 of the single-mode polarization maintaining fiber 112 to thereby remove excitation light actively.

As a material having a refractive index of 1.5 or more, a silicone oil or a silicone gel is conventionally used as a refractive index matching solution. However, these materials are hard to be held because they are liquid. Thus, this embodiment is provided with an ultraviolet curing resin or a thermo-setting resin (e.g., Opticlear (n=1.52 or so) by Shin-Etsu Chemical Co.) of a silicone system. An ultraviolet curing resin of epoxy system can also be employed, as long as it has a refractive index of 1.5 or more.

As described above, FIG. 2 shows a configuration of the fiber laser wavelength conversion green light source according to this embodiment. What is different from the above described first embodiment is that a joint 110 of a double-clad polarization maintaining fiber 111 and a single-mode polarization maintaining fiber 112, and a coil-shaped portion 702 formed by a coat removed portion of the single-mode polarization maintaining fiber 112 are placed in a material having a refractive index of 1.5 or more. Primary coat coating the single-mode polarization maintaining fiber 112 is usually made of a material whose refractive index is 1.5 or higher. This coat has a thickness of approximately 70 μm. Consequently, energy concentrates in this coat to cause overheat.

In this embodiment, the coil-shaped portion 702 is coated with a resin at a thickness of 1 mm or more to thereby prevent overheating. The resin 703 coating the coil-shaped portion 702 of the fiber 112 is poured in an alumite-treated aluminum container 704, and the joint 110 and the coil-shaped portion 702 of the single-mode polarization maintaining fiber 112 are buried. Thereafter, the resin is solidified. The dimensions of the part into which the resin 703 is poured are length×width×depth=35 mm×35 mm×2 mm. Although it is preferable that the area of length×width is as large as possible, an excessive area makes the apparatus larger. Accordingly, it is preferable that the area is within a range of 30 mm×30 mm to 50 mm×50 mm.

In this way, the filling of the material having a refractive index close to that of the clad of the fiber 112 makes it possible to extract residual excitation light efficiently, and transmitting residual excitation light over a wider area to thereby prevent overheat and enhance heat radiation.

In this embodiment, a glass material may also be used as the material whose refractive index is 1.5 or more. However, the use of a glass material requires an operation of forming into a shape operable to hold the coil-shaped portion 702 of the single-mode polarization maintaining fiber 112. Hence, the production costs and the operations steps for production become greater than molding of the resin. In this embodiment, as the material whose refractive index is 1.5 or more is used resin, such as an ultraviolet curing resin and a thermo-setting resin of silicone system, and an ultraviolet curing resin of epoxy-system, to thereby eliminate the necessity of machining a member, and thus reduce the production costs and the operation steps for production.

In this embodiment, the energy of residual excitation light is converted into heat to thereby raise the temperature inside of the housing of the fiber laser device by three to five degrees. As the temperature rises, the reflection wavelength of the fiber grating 104 determining an oscillation wavelength placed on the emission side shifts to the long-wavelength side at 0.01 nm/° C. in the case of a typical value. This wavelength shift may cause the green light output to fall when the green light is generated by a wavelength conversion. Therefore, it is preferable that the fiber grating 104 itself is held on a substrate which is able to contract as the temperature rises (or a temperature compensating package is used), or the fiber grating 104 is arranged outside of the housing. In the case where the fiber grating 104 is disposed inside of the housing, it is preferable to dispose it below the residual excitation light radiating-and-absorbing mechanism 701 which is a heat source to thereby attain thermal separation.

In order to enhance the effect further, the residual excitation light radiating-and-absorbing mechanism 701 is preferably provided with a radiation fin or the like which is cooled by a cooling fan or the like.

In this embodiment, the coil-shaped portion 702 of the residual excitation light radiating-and-absorbing mechanism 701 may be replaced with a straight-shaped portion where a coating (primary coat) is removed because it is filled with the material having a refractive index close to that of the clad of the fiber 112, and residual excitation light can be efficiently radiated. In the case where residual excitation light is required to be radiated more efficiently, of course, a coil shape is preferable to a straight shape.

Third Embodiment

A third embodiment of the present invention provides away where a lens system is provided between a rare-earth-doped double-clad polarization maintaining fiber and a single-mode polarization maintaining fiber to thereby allow a laser light to go out into space, and then, excitation light is decreased utilizing a difference in convergence beam diameter between excitation light and oscillation light.

Figure 3:
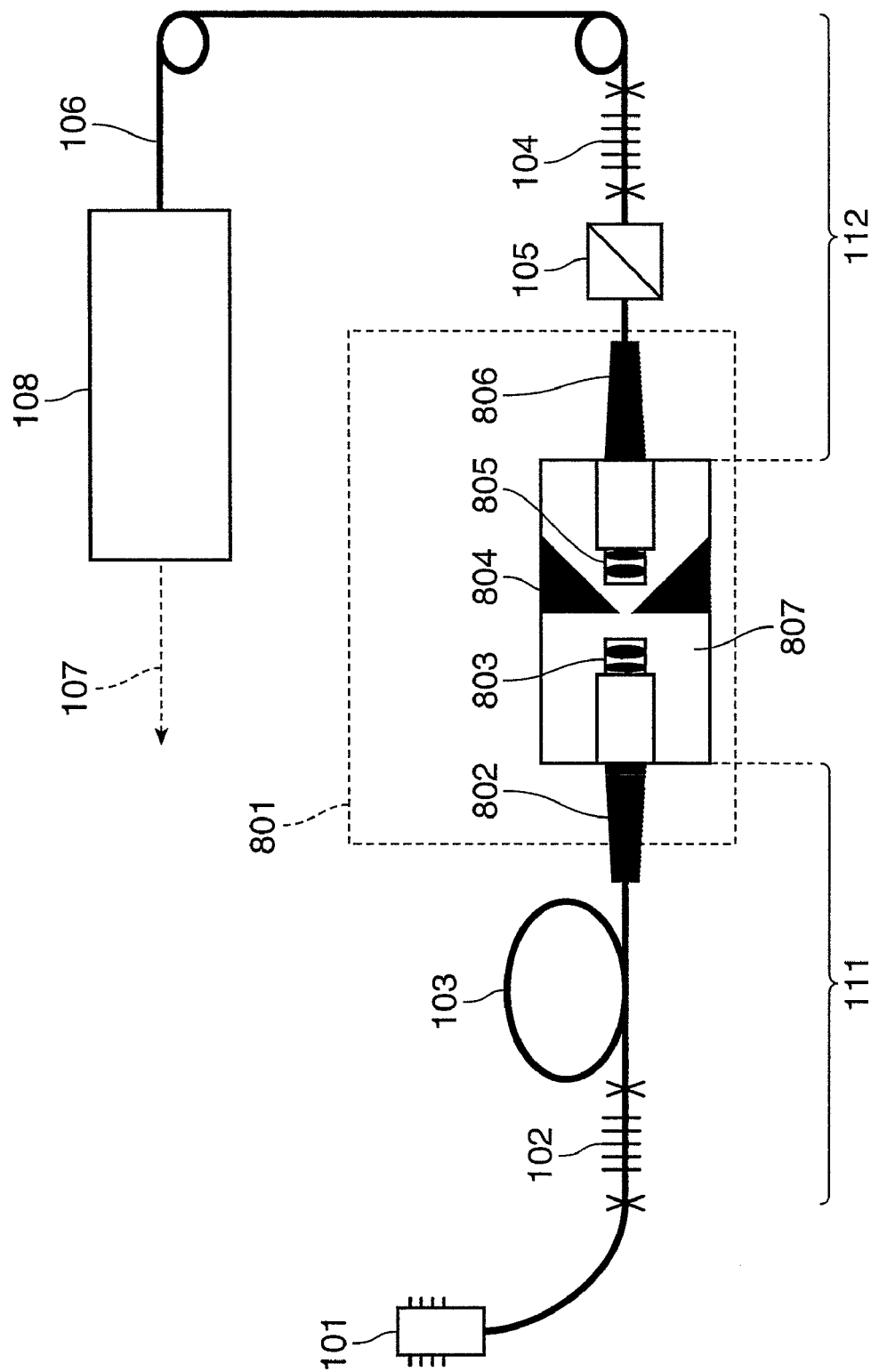
FIG. 3 is a schematic diagram showing a configuration of a fiber laser light source according to a third embodiment of the present invention.

FIG. 3 shows a configuration of a wavelength-conversion light source device provided with a fiber laser according to the third embodiment. In FIG. 3, the laser light source device according to this embodiment includes: a pumping LD 101; a fiber grating 102; a Yb-doped double-clad polarization maintaining fiber 103; a fiber grating 104; and an excitation light absorbing mechanism 801. The laser light source device according to this embodiment is connected to a SHG (second-harmonic generation) module 108 via an oscillation light propagation fiber 106. A polarizer 105 is provided to unify oscillating laser light into a single direction.

A laser resonator is mainly constructed by a set of the fiber grating 102 and the fiber grating 104, and the double-clad polarization maintaining fiber 103 doped with a rare earth as a laser active material. Pumping is conducted by the pumping LD 101. The construction of the laser resonator is the same as the above described first and second embodiments.

In this embodiment, a residual excitation light absorbing mechanism 801 is substituted for the residual excitation light radiating-and-absorbing mechanisms 601 and 701 according to the first and second embodiments. The residual excitation light absorbing mechanism 801 including a lens system and an excitation light absorbing portion is provided in a part where a double-clad polarization maintaining fiber 111 changes to a single-mode polarization maintaining fiber 112.

The residual excitation light absorbing mechanism 801 according to this embodiment will be described with reference to FIG. 4.

Figure 4:
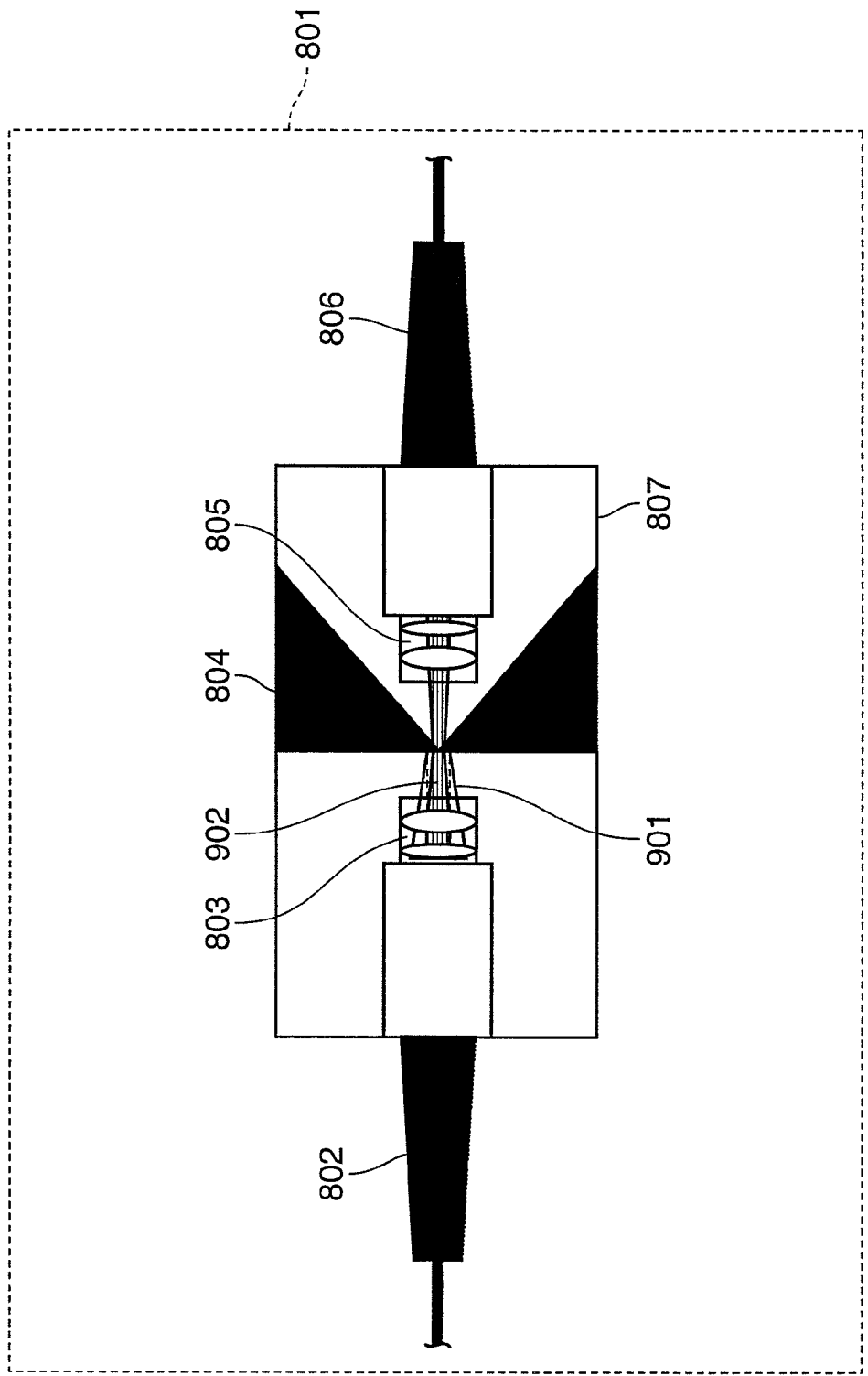
FIG. 4 is a schematic diagram showing a configuration of a residual excitation light absorbing mechanism of the fiber laser light source according to the third embodiment.

In FIG. 4, the residual excitation light absorbing mechanism 801 is constructed by a double-clad polarization maintaining fiber 802, a collimating lens set 803, an excitation light absorber 804, a fiber coupling lens set 805 and a single-mode polarization maintaining fiber 806.

In this embodiment, the diameter of the core of the double-clad polarization maintaining fiber 802 is 6 μm; the diameter of an inner clad through which excitation light propagates is 105 μm; and the diameter of an outer clad is 125 μm. Further, the diameter of the core of the single-mode polarization maintaining fiber 806 is 6 μm, and the diameter of the clad is 125 μm.

In this embodiment, oscillation light (1060-nm band in this embodiment) passing through the 6 μm-core of the double-clad polarization maintaining fiber 802 and excitation light (915-nm band in this embodiment) passing through the part of the 105 μm-inner clad pass through the collimating lens set 803, thereby coming into parallel beams. Utilizing a diameter difference of the beams, the excitation light absorber 804 absorbs and eliminates unnecessary excitation light 901.

Specifically, the diameter of parallel beams (collimated beams) of the oscillation light 902 is 200 μm and the diameter of the excitation light 901 is 430 μm. Accordingly, the excitation light absorber 804 is formed with a pinhole of approximately 250 μm to thereby absorb only the excitation light 901 and convert it into thermal energy. This thermal energy is radiated to a housing 807 holding the lens sets 803 and 805.

The oscillation light 902 which has passed through the pinhole of the excitation light absorber 804 is focused to the single-mode polarization maintaining fiber 806 via the fiber coupling lens set 805, and propagates through the core of the fiber 806.

The above described structure makes it possible to keep out the residual excitation light, and prevent the fiber from deteriorating.

In assembling the residual excitation light absorbing mechanism 801, adjusting of positions of the components is required to maximize the transmission quantity of oscillation light propagating through the core of the single mode fiber 806. In this embodiment, compared with the conventional way of providing a separate mirror, the adjustment can be accomplished simply observing the transmission quantity. This helps decrease the adjustment costs.

Furthermore, in the use of the residual excitation light absorbing mechanism 801, the body housing 807 generates heat of 2.5 W when pumping is conducted with excitation light of 10 W. This requires a radiating mechanism such as a radiation fin. A radiation fin for CPU is sufficient for 10 W-excitation light. However, in the case where the quantity of excitation light is 20 W or larger, it is preferable to cool a radiation fin fixedly attached to the residual excitation light absorbing mechanism 801 by a fan motor or the like.

Fourth Embodiment

In a fourth embodiment of the present invention, a lens system is provided between a rare-earth-doped double-clad polarization maintaining fiber and a single-mode polarization maintaining fiber. Laser light is once allowed to go out to space and be incident perpendicularly upon a dielectric multilayer mirror to be thereby separated into excitation light and oscillation light, and the excitation light is returned to the rare-earth-doped double-clad polarization maintaining fiber.

Similarly to the laser light source device according to the third embodiment shown in FIG. 3, in a laser light source device according to this embodiment, a laser resonator includes a set of a fiber grating 102 and a fiber grating 104, and a double-clad polarization maintaining fiber 103 doped with a rare earth as a laser active material. Pumping is conducted using a pumping LD 101. In this embodiment, a residual excitation light reflecting mechanism which includes a lens system and a dielectric multilayer mirror is provided in a part where a double-clad polarization maintaining fiber 802 changes to a single-mode polarization maintaining fiber 806.

Figure 5:
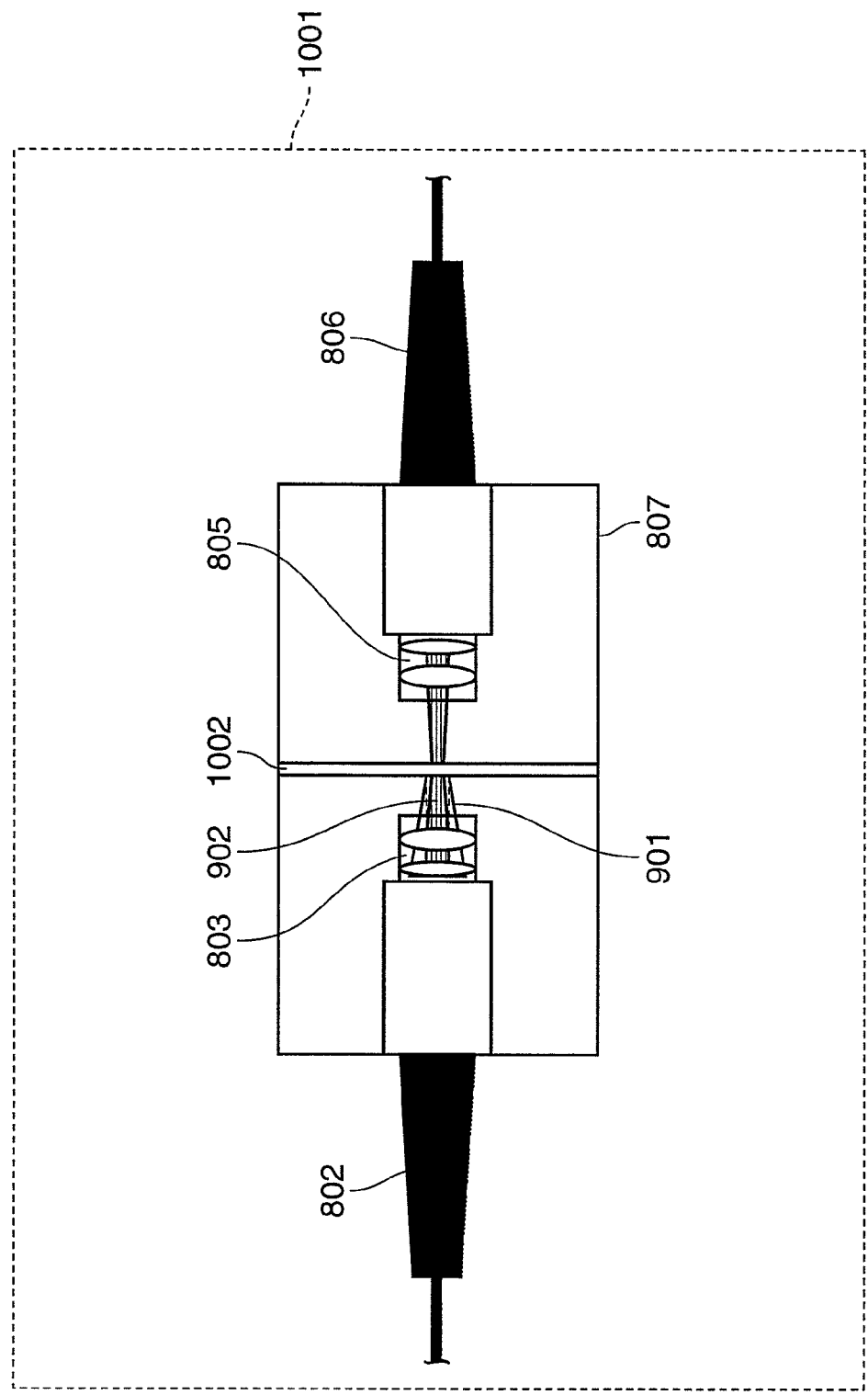
FIG. 5 is a schematic diagram showing a configuration of a residual excitation light reflecting mechanism of a fiber laser light source according to a fourth embodiment of the present invention.

The residual excitation light reflecting mechanism according to this embodiment will be described with reference to FIG. 5.

A residual excitation light reflecting mechanism 1001 is constructed by the double-clad polarization maintaining fiber 802, a collimating lens set 803, an excitation light reflecting dielectric-multilayer mirror 1002, a fiber coupling lens set 805, and the single-mode polarization maintaining fiber 806.

In this embodiment, the diameter of the core of the double-clad polarization maintaining fiber 802 is 6 μm; the diameter of an inner clad for propagating excitation light is 105 μm; and the diameter of an outer clad is 125 μm. Further, the diameter of the core of the single-mode polarization maintaining fiber 806 is 6 μm, and the diameter of the clad is 125 μm.

The dielectric multilayer mirror 1002 is arranged in an area where is between the collimating lens set 803 and the fiber coupling lens set 805 and oscillation light 902 becomes parallel. The dielectric multilayer mirror 1002 reflects 915-nm band light and transmits 1064-nm band light, which thereby enables to focus only the 1064-nm band light to the single-mode polarization maintaining fiber 806.

On the other hand, the reflected 915-nm band light is incident again upon the collimating lens set 803 and is guided again to the rare-earth-added double-clad polarization maintaining fiber 802. Thereby, the 915-nm band light, which is residual excitation light, is absorbed again to the rare-earth-added double-clad polarization maintaining fiber 802. In the course of propagating ahead and back repeatedly through the rare-earth-added double-clad polarization maintaining fiber 802, 94% of the light is absorbed (9.4 W in 10-W excitation light).

In this embodiment, the light which has once passed through the rare-earth-added double-clad polarization maintaining fiber 802 is returned thereto and absorbed again. This helps reduce a loss in excitation light and obtain oscillation light more efficiently (at a higher light-light conversion efficiency) from the excitation light.

Fifth Embodiment

Figure 6:
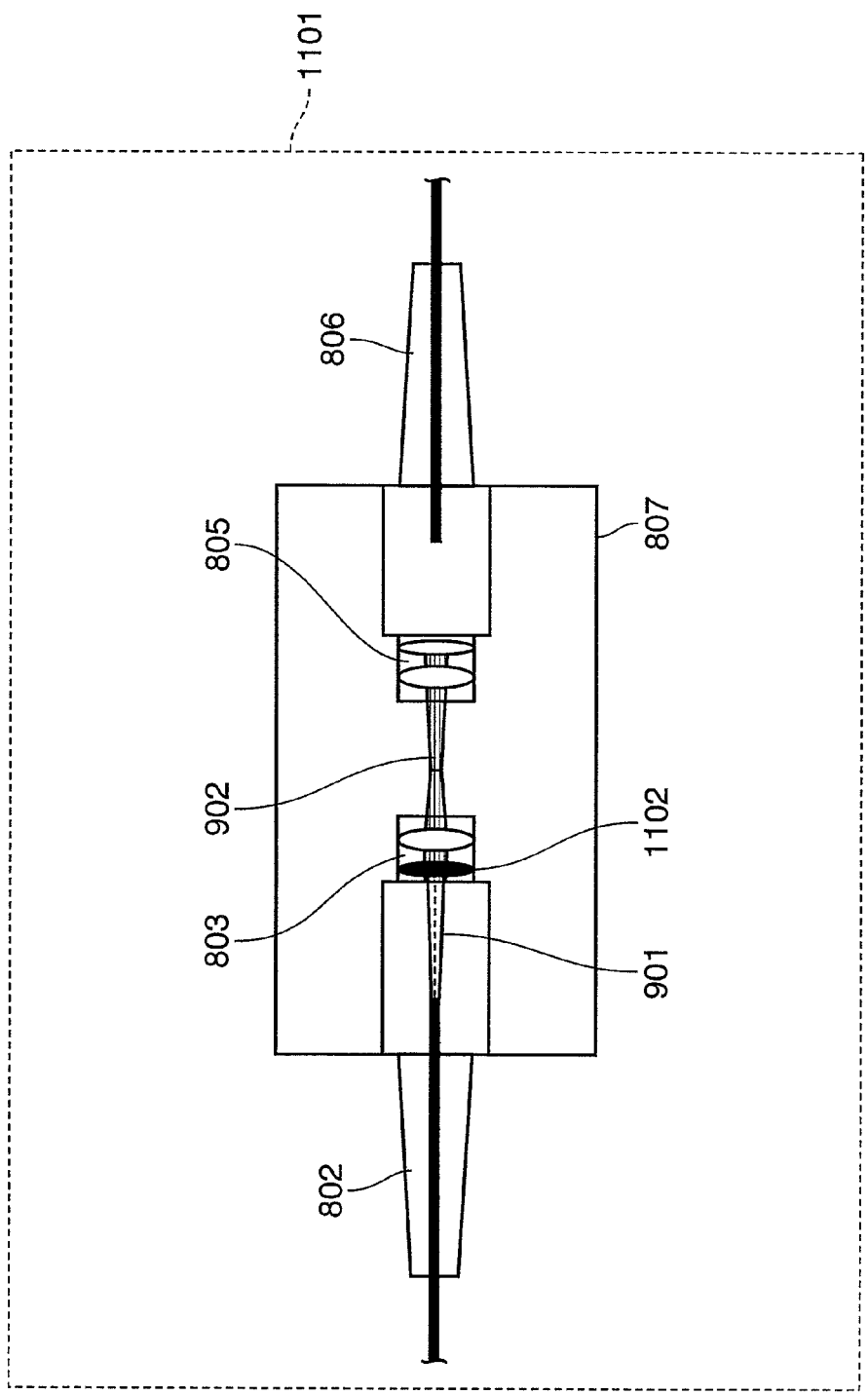
FIG. 6 is a schematic diagram showing a configuration of a residual excitation light reflecting mechanism of a fiber laser light source according to a fifth embodiment of the present invention.

FIG. 6 shows a configuration of a residual excitation light reflecting mechanism of a fiber laser light source according to a fifth embodiment of the present invention.

In the fourth embodiment is used the residual excitation-light reflecting mechanism 1001 in which the dielectric multilayer mirror 1002 is provided between the collimating lens set 803 and the fiber coupling lens set 805 for focusing the oscillation light 902 again to the single-mode polarization maintaining fiber 806. In this embodiment, as shown in FIG. 6, a dielectric multilayer coating mirror 1102 which reflects 915-nm band light is provided on a surface of a collimating lens set 803, thereby eliminating the necessity of providing the dielectric multilayer mirror 1002 shown in FIG. 5.

In this embodiment, the alignment of residual excitation light can be automatically completed by performing alignment of lenses, thus eliminating adjustment of a mirror angle. This is advantageous in simplifying the adjustment operation.

Sixth Embodiment

Figure 7:
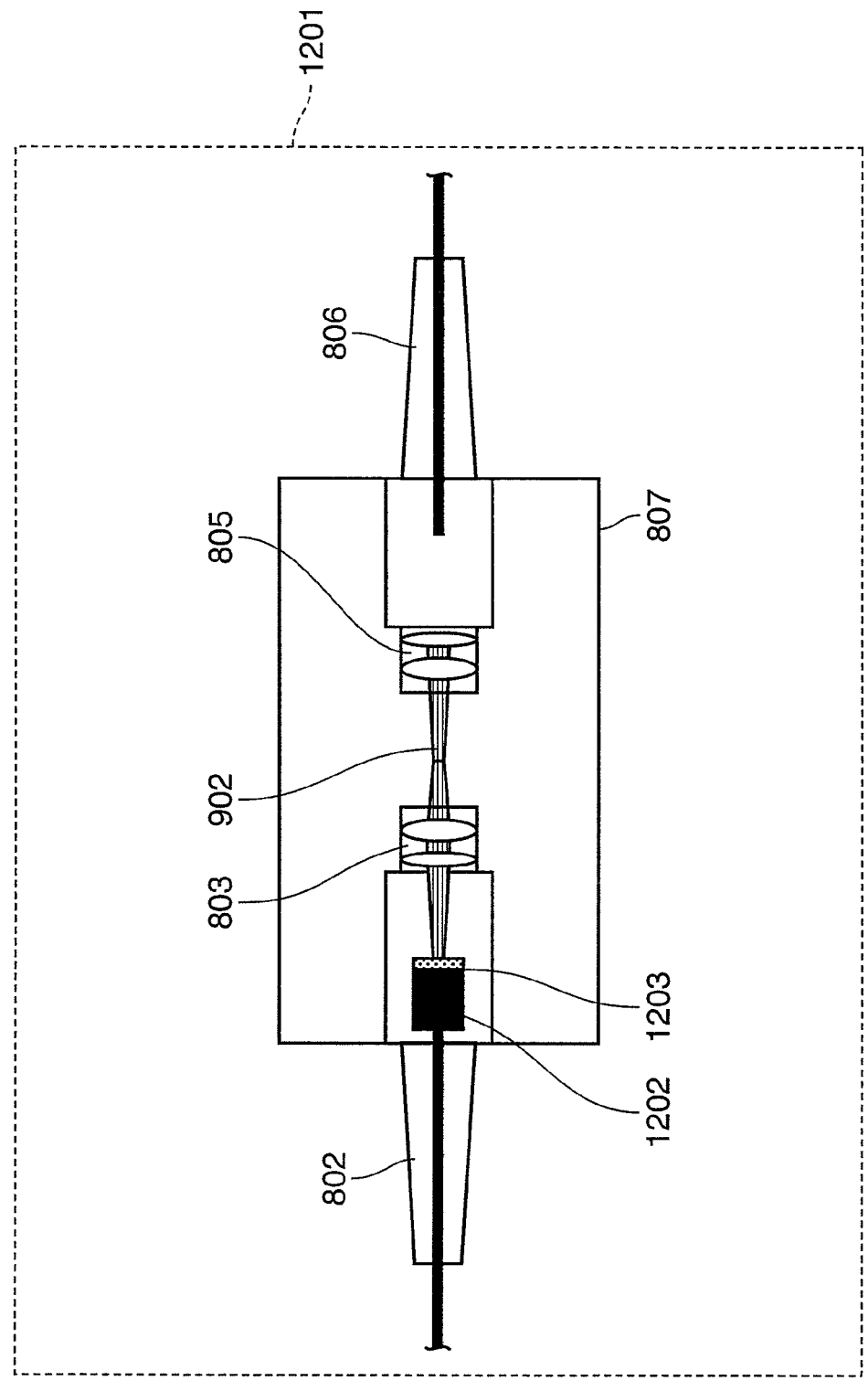
FIG. 7 is a schematic diagram showing a configuration of a residual excitation light reflecting mechanism of a fiber laser light source according to a sixth embodiment of the present invention.

FIG. 7 shows a configuration of a residual excitation light reflecting mechanism according to a sixth embodiment of the present invention.

In the residual excitation light reflecting mechanism 1201 according to the sixth embodiment, a glass or zirconia ferrule 1020, which is used in an optical fiber connector or the like, holds a front end of the rare-earth-added double-clad polarization maintaining fiber 802. Its end surface holding the front end is polished, and formed with a dielectric multilayer mirror 1203 which is operable to reflect 915-nm band light and transmit 1064-nm band light.

In this case, in the same way as the fifth embodiment, a mirror is provided on a fiber-emission end surface, thus eliminating a mirror alignment. The adjustment can be automatically completed without alignment of residual excitation light merely by conducting the optical axis alignment of the fundamental wave light source. This is advantageous in simplifying the adjustment operation significantly.

Seventh Embodiment

Figure 8:
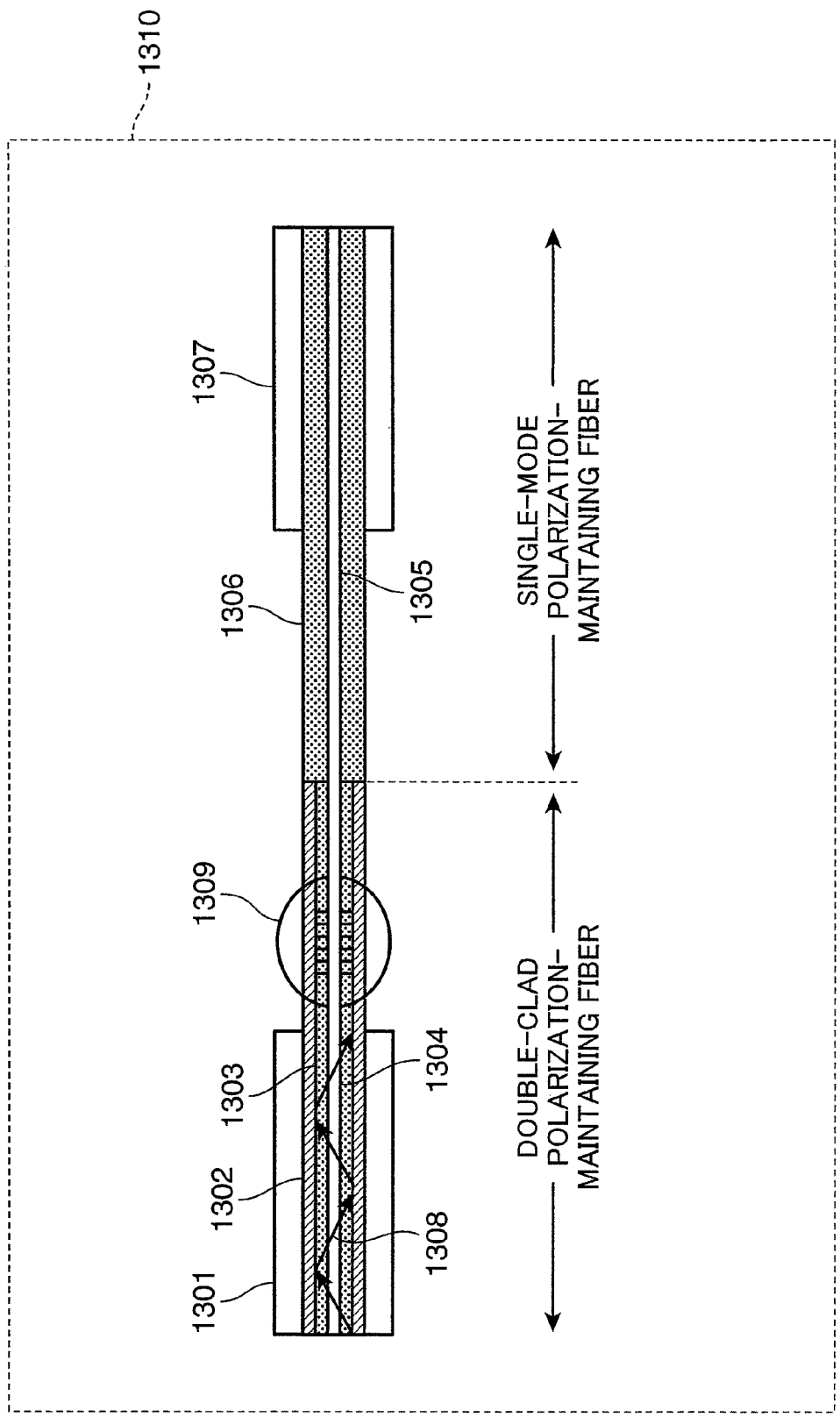
FIG. 8 is a schematic diagram showing a configuration of a residual excitation light reflecting mechanism of a fiber laser light source according to a seventh embodiment of the present invention.

FIG. 8 shows a configuration of a residual excitation light reflecting mechanism according to a seventh embodiment of the present invention.

In this embodiment, a residual excitation light reflecting mechanism 1310 includes a double-clad polarization maintaining fiber a part of which is formed with a fiber grating operable to reflect 915-nm band light. FIG. 8 shows a position where the fiber grating 1309 reflecting 915-nm band light is formed.

A double-clad polarization maintaining fiber is usually added in only an inner clad 1303, or both the inner clad 1303 and a core 1304 with germanium to improve the sensitivity to a refractive index variation caused by ultraviolet light. From an effective refractive index of the fiber and a reflection wavelength, the interval of the fiber grating 1309 can be calculated as $\Lambda$ [interval]=$\lambda$ [reflection wavelength]/(2·neff [effective refractive index]). In the case where the reflection wavelength is 915 nm, if the effective refractive index of the fiber is 1.43, the formation interval of the fiber grating 1309 is calculated to be approximately 320 nm. This fiber grating 1309 can reflect residual excitation light without allowing light to go out temporarily into space.

Figure 17:
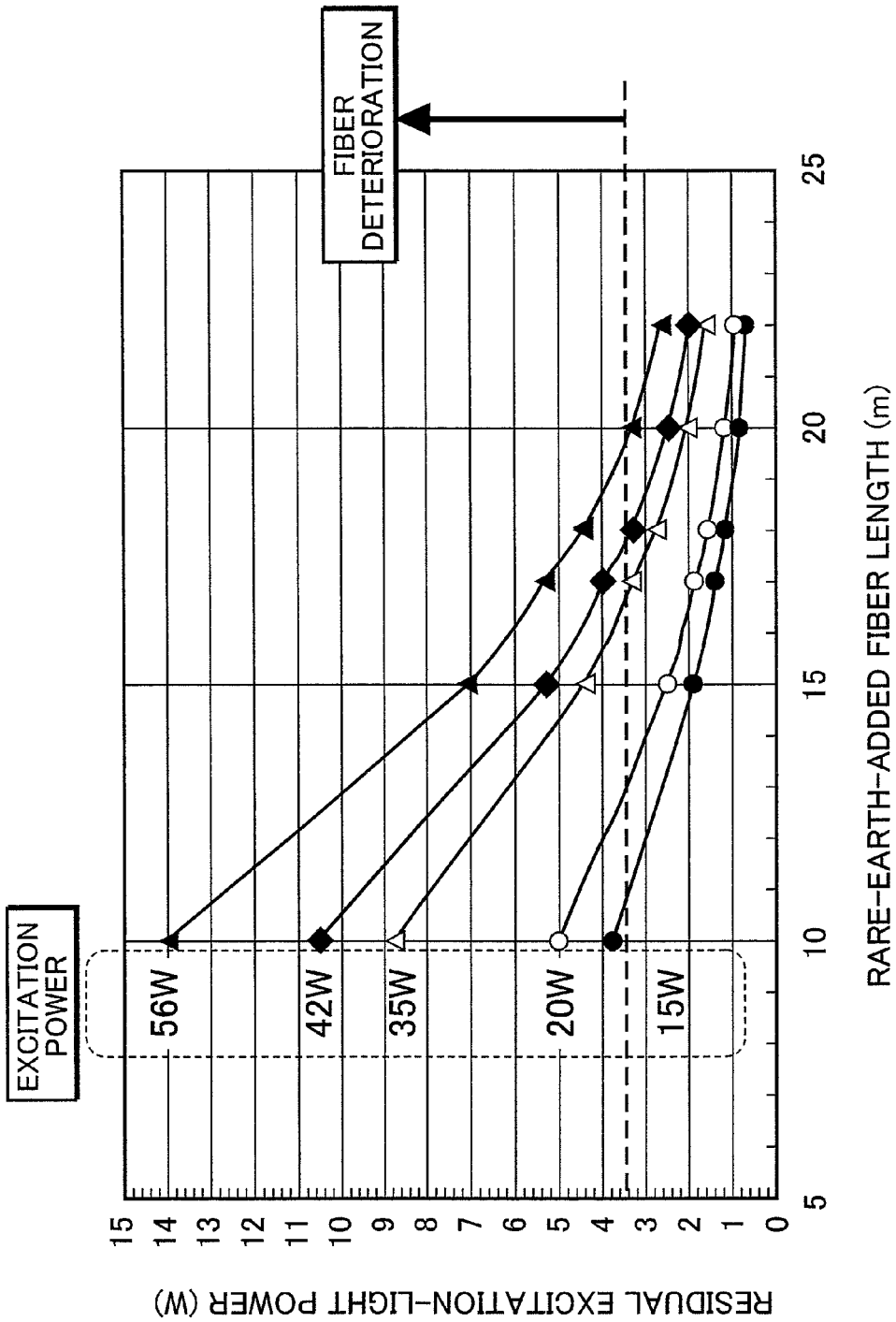
FIG. 17 is a plotting graph showing a relationship between the length of a Yb-doped fiber and residual excitation light, the power of excitation light being a parameter.
Figure 18:
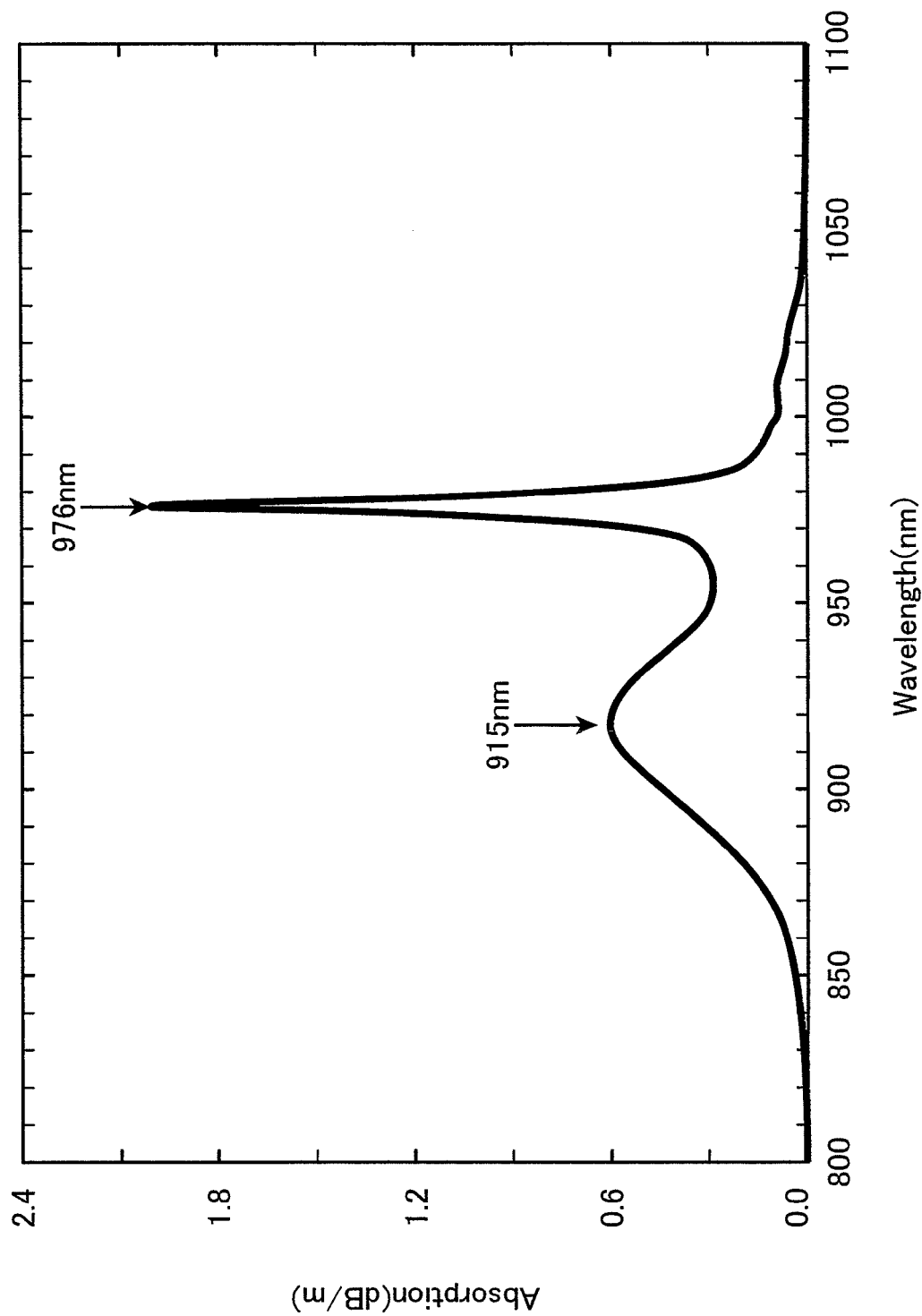
FIG. 18 is a plotting graph showing an absorption spectrum of a Yb-added double-clad fiber.

The above laser light source devices according to the first to seventh embodiments are suitable for a green light source of a laser display apparatus which requires high output light. For example, when 3-W green light is generated, if an oscillation wavelength of the laser light source device is 1070 nm, necessary excitation light power is 20 W and the wavelength of generated green light is 535 nm. This needs a fiber length of 15 m. When generating green light much more, as shown in FIG. 17, the light generation exceeds the level preventing the fiber deterioration. In this case, it will be seen that the laser light source devices according to the first to seventh embodiments are useful to prevent the deterioration of the fiber.

If the oscillation wavelength of the laser light source device is 1030 nm, necessary excitation light power is 25 W and the wavelength of generated green light is 515 nm. This needs a fiber length of 10 m. In this case, as shown in FIG. 17, the light generation exceeds the level preventing the fiber deterioration. Therefore, the laser light source devices according to the first to seventh embodiments are provided to thereby prevent the fiber deterioration.

Further, if the oscillation wavelength is 1050 nm, the necessary fiber length is 12 m. At green light of 1 W, the light generation exceeds the fiber deterioration prevention level. If the oscillation wavelength is 1060 nm, the necessary fiber length is 14 m. At green light of 2 W, the light generation exceeds the fiber deterioration prevention level. Accordingly, it is necessary to provide the laser light source devices according to the first to seventh embodiments.

Herein, a description will be given about arrangement of the fiber laser light source device on the housing according to the present invention. The residual excitation light radiating-and-absorbing mechanism, the residual excitation light absorbing mechanism, and the residual excitation light reflecting mechanism according to the first to seventh embodiments are each a heat source in the housing. In the first, second, third embodiments, particularly, the energy of residual excitation light is converted to heat, and then radiated.

Figure 9A:
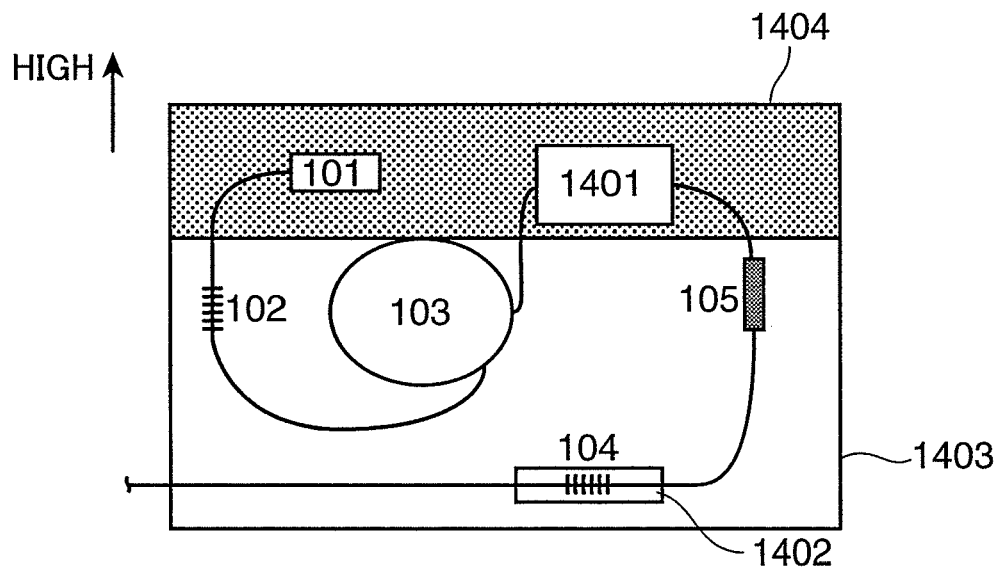
FIGS. 9A and 9B are each a schematic diagram showing how to arrange each component in a housing of the fiber laser light source according to the first to seventh embodiments.
Figure 9B:
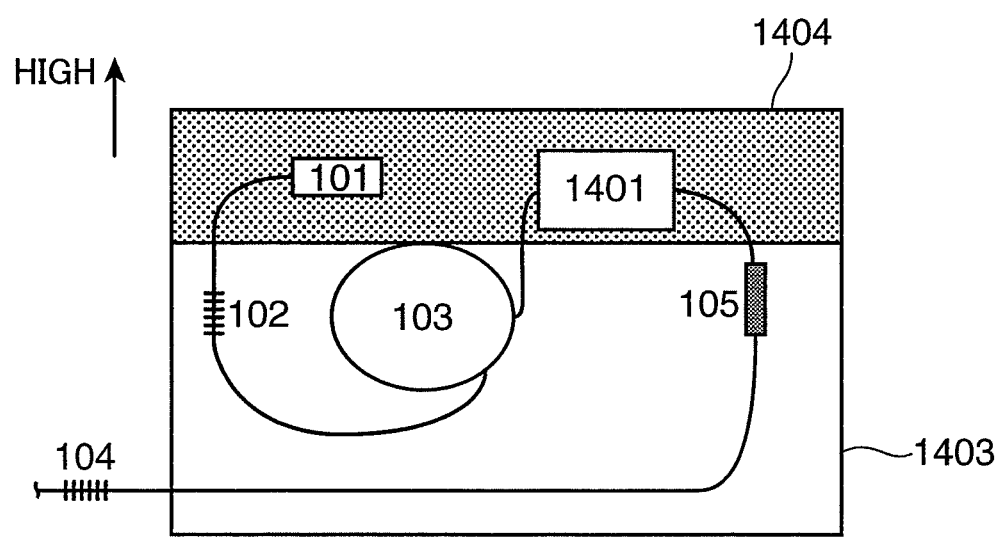

In FIGS. 9A and 9B, an exciting laser diode 101 and the residual excitation light radiating-and-absorbing mechanism 1401 of the first embodiment are provided as a heat source in a housing 1403 of the fiber laser light source. Naturally, the residual excitation light radiating-and-absorbing mechanism 1401 may also be replaced with the residual excitation light radiating-and-absorbing mechanism according to the second embodiment, the residual excitation light absorbing mechanism according to the third embodiment, or the residual excitation light reflecting mechanisms according to the fourth to seventh embodiments.

As shown in FIGS. 9A and 9B, the residual excitation light radiating-and-absorbing mechanism 1401 is preferably arranged at as upper position as possible inside of the housing 1404.

Particularly, the fiber grating 104 on the emission side of oscillation light is preferably arranged below the laser diode 101 or the residual excitation light radiating-and-absorbing mechanism 1401 which is a heat source, in other words, is thermally separately arranged. This is because the two heat sources generate heat to thereby raise the housing-inside temperature by about 10° C., and causes the reflection center wavelength of the fiber grating 104 to shift gradually toward the long wavelength side. In order to avoid this long wavelength shift, it is preferable to provide the fiber grating apart from the heat sources.

Particularly, in FIG. 9A, the fiber grating 104 is provided with a temperature compensating mechanism 1402 and placed inside of the housing 1404.

In FIG. 9B, the fiber grating 104 is placed outside of the housing 1403 to thermally separate from the rising temperature inside of the housing 1403.

Further, it is preferable that a radiation fin and a cooling fan 1404 are provided near the heat source.

As described above, the arrangement shown in FIGS. 9A and 9B makes it possible to realize a fully-air-cooled fiber laser fundamental wave light source device which can be used for wavelength conversion which has the strict requirement against wavelength variation (0.01 nm or less).

Figure 10:
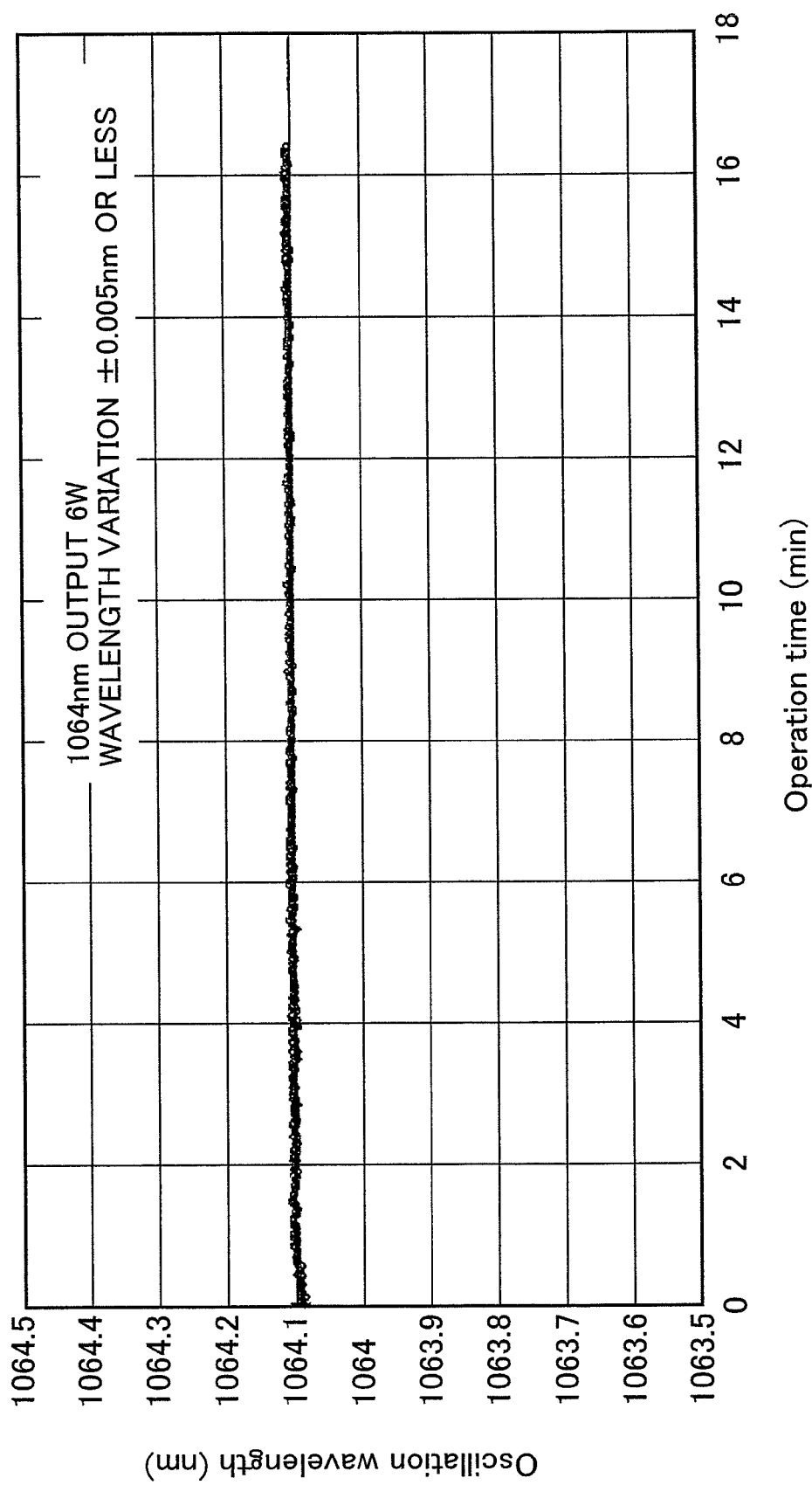
FIG. 10 is a plotting graph showing a wavelength stability of a fiber laser light source according to the present invention.

FIG. 10 is a plotting graph showing a variation in the wavelength of 1064-nm fundamental wave light at an output of 6 W in the fiber laser light source device having the arrangement shown in FIG. 9B. In this case, the wavelength variation width is 0.005 nm or less, thus satisfying the conditions required for wavelength conversion sufficiently.

The temperature compensating mechanism 1402 shown in FIG. 9A is effective, but taking costs into account, the arrangement of the fiber grating 104 outside of the housing 1403 is more preferable.

Eighth Embodiment

The above described laser light source devices according to the first to seventh embodiments are used as a display light source for a laser display apparatus (image display apparatus), a light source for back light of a liquid crystal display apparatus, or a decorative illumination light source apparatus.

Figure 11:
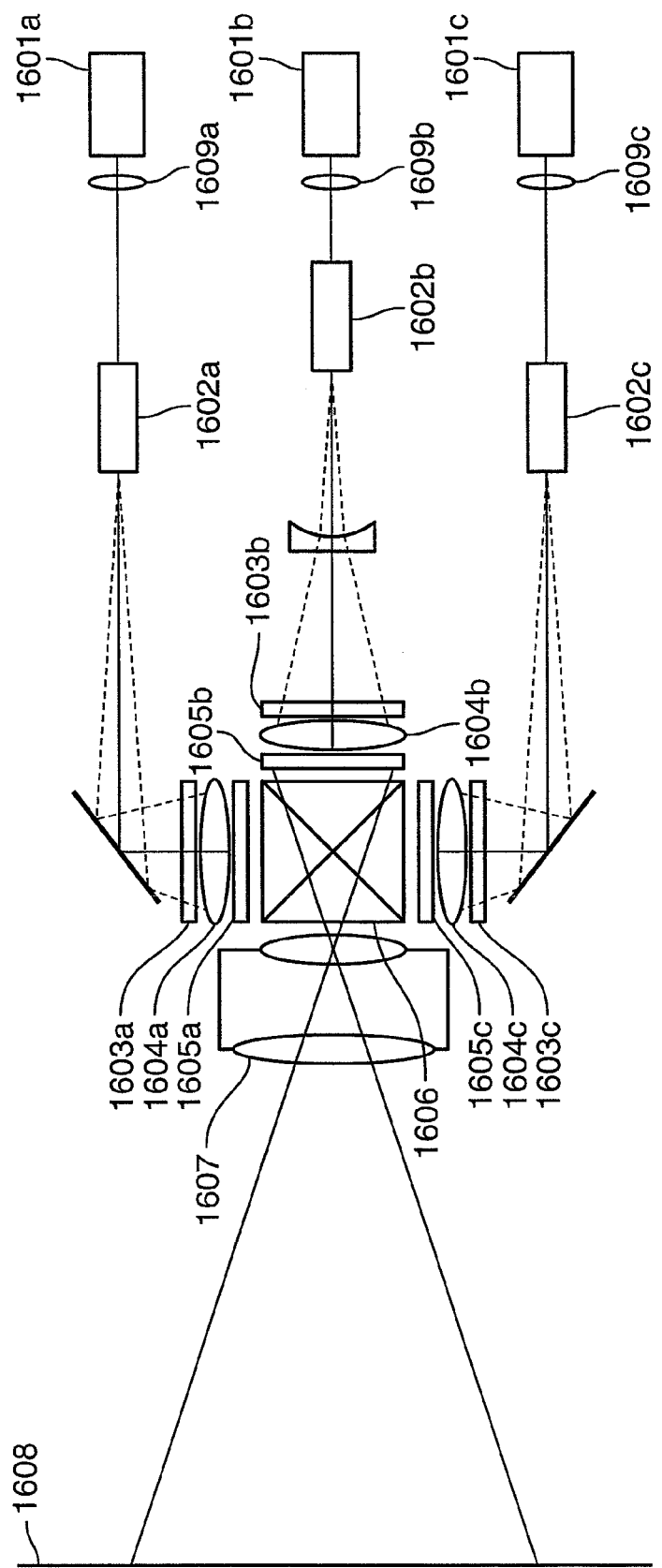
FIG. 11 is a schematic diagram showing an exemplary two-dimensional image display apparatus provided with the fiber laser light source according to the present invention.

As an exemplary application of the laser light source devices according to the first to seventh embodiments, a configuration of a laser display apparatus (image display apparatus) which is provided with the laser light source device will be described with reference to FIG. 11.

The laser light source device includes laser light sources 1601a to 1601c having three colors of red (R), green (G) and blue (B), respectively. The red laser light source 1601a is provided with a GaAs semiconductor laser having a wavelength of 638 nm. The blue laser light source 1601c is provided with a GaN semiconductor laser having a wavelength of 465 nm. The green laser light source 1601b is provided with a wavelength conversion green light source device including a wavelength conversion element which halves the wavelength of an infrared laser. The laser light source devices according to the first to seventh embodiments are used as the wavelength conversion green light source device.

A laser beam emitted by each light source 1601a, 1601b, 1601c is two-dimensionally scanned by a reflection type two-dimensional beam scanners 1602a to 1602c to thereby irradiate diffusion plates 1603a to 1603c. The laser light beams which have been two-dimensionally scanned over the diffusion plates 1603a to 1603c pass through field lenses 1604a to 1604c, and then go to two-dimensional spatial light modulating elements 1605a to 1605c, respectively.

Herein, image data is divided into R, G and B. Each signal is inputted in the two-dimensional spatial light modulating elements 1605a to 1605c, and combined by a dichroic prism 1606 to form a color image. The combined image is projected onto a screen 1608 by a projection lens 1607. The diffusion plates 1603a to 1603c are placed as a speckle noise remover in front of the two-dimensional spatial modulating elements 1605a to 1605c. The diffusion plates 1603a to 1603c are swung to thereby reduce speckle noises. A lenticular lens or the like may also be used as the speckle noise remover.

In this embodiment, a semiconductor laser is used for each color. However, outputs of two to eight semiconductor lasers may be outputted from a single fiber by a bundle fiber. In this case, the width of a wavelength spectrum becomes several nanometers which is very broad. This broad spectrum suppresses the occurrence of speckle noises.

The above described image display apparatus may be configured so as to project am image from behind a screen, that is, a rear projection display.

As the two-dimensional spatial modulating elements 1605a to 1605c, a reflection type spatial modulating element (DMD mirror) including integrated micro mirrors may be used. Further, a two-dimensional spatial modulating element including a liquid crystal panel, or a two-dimensional spatial modulating element including a galvano mirror and a mechanical micro switch (MEMS) may also be used.

In the case of a light modulating element having less influence of polarization component to a light modulation characteristic, such as reflection type spatial modulating element, MEMS, and galvano mirror, an optical fiber for propagating a harmonic is not required to be a polarization maintaining fiber such as PANDA fiber. However, in the case of using a two-dimensional spatial modulating element including a liquid crystal panel, a polarization maintaining fiber may be preferably used because the modulation characteristic and the polarization characteristic are greatly related to each other.

Figure 12A:
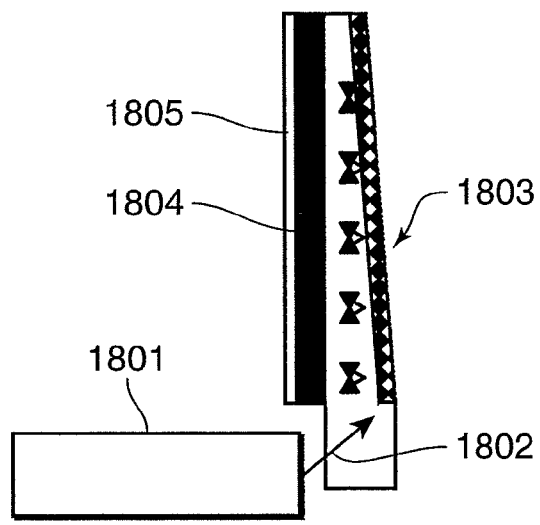
FIG. 12A is a schematic diagram showing an exemplary liquid crystal display apparatus provided with the fiber laser light source according to the present invention.
Figure 12B:
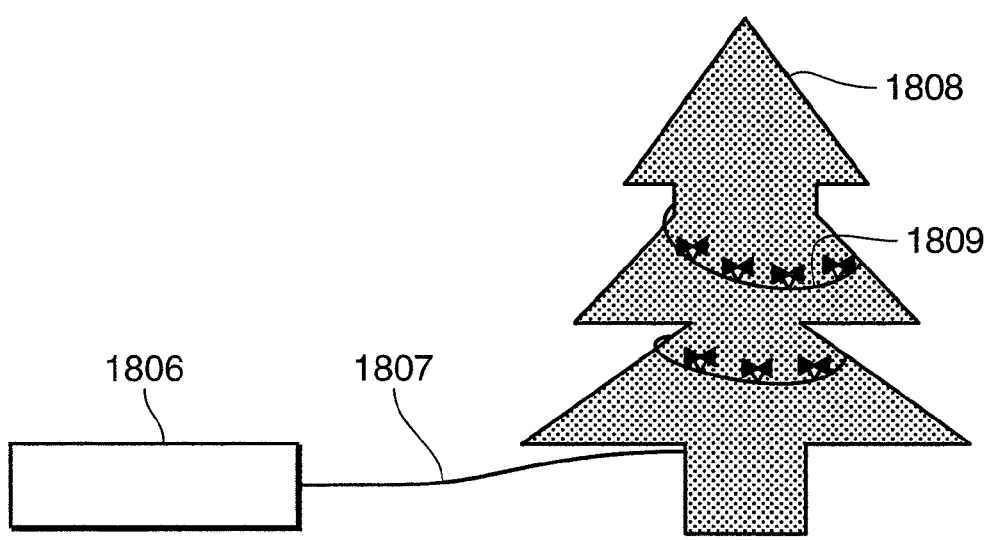
FIG. 12B is a schematic diagram showing an exemplary decorative-illumination light source apparatus provided with the fiber laser light source according to the present invention.

Next, as another exemplary application of the laser light source devices according to the first to seventh embodiments, FIGS. 12A and 12B show respective configurations of a light source for back light of a liquid crystal display apparatus and a decorative illumination light source apparatus, respectively which are provided with the laser light source device.

FIG. 12A shows a configuration of the liquid crystal display apparatus provided with the laser light source device according to the first to seventh embodiments.

A laser light beam 1802 which is emitted by a laser light source device 1801 according to the first to seventh embodiments illuminates a liquid crystal panel 1804 uniformly through a light guide and diffusion plate 1803.

The light which has been generated by the laser light source device 1801 has a single polarization (linear polarization). Accordingly, the light illuminating the liquid crystal panel 1804 can be single-polarized, which can thus eliminate a polarizer which is required to be provided on an incidence side when a conventional fluorescence tube or light emitting diode is used as alight source. Consequently, material costs can be reduced, and the quantity of transmitted light can be increased by 10 to 20%. This makes it possible to produce a brighter liquid crystal display.

FIG. 12B shows a configuration of the decorative illumination light source apparatus which is provided with the laser light source device according to the first to seventh embodiments.

A laser light beam which is emitted by a laser light source device 1806 according to the first to seventh embodiments is transmitted to an object 1808 to be illuminated, such as a building and a tree, through a visible light propagation fiber 1807. A fiber 1809 attached to the illuminated object 1808 is provided with a light scattering mechanism to thereby radiate light outside. The light scattering mechanism is constructed by forming a fiber grating or setting the refractive index of a fiber coating at approximately 1.43. Besides, linearly-polarized light having several wavelengths may be allowed to be incident upon the fiber to control color.

The display light source of the laser display apparatus (image display apparatus), the light source for back light of liquid crystal display apparatus, or the decorative illumination light source apparatus in the foregoing embodiments are described merely as an example. It is needless to say that another applications can be adopted.

With reference to the foregoing embodiments, the present invention may be summarized as follows. Specifically, a laser light source device according to the present invention includes: a double-clad fiber added with a rare earth as a laser active material; a laser light source for emitting excitation light to the double-clad fiber to excite the double-clad fiber; a set of fiber gratings for determining a wavelength of oscillation light in the double-clad fiber; a single-mode fiber for propagating the oscillation light in the double-clad fiber; and a wavelength conversion module for converting the oscillation light in the double-clad fiber into a harmonic. Residual excitation light in the double-clad fiber into which the excitation light has been allowed to fall from the laser light source is prevented from exiting to the single-mode fiber.

In this laser light source device, residual excitation light in the double-clad fiber into which the excitation light has been allowed to fall from the laser light source is prevented from exiting to the single-mode fiber. This makes it possible to prevent the fiber from degrading even when high output light is generated. As a result, in an image display apparatus provided with this laser light source device, the color reproduction range can be made wider than any conventional solid state laser.

Furthermore, in the laser light source device, laser light as excitation light can be used within a band of 915 nm which is broader in the absorption spectrum of a rare earth fiber. Hence, there is no need to control the temperature of a laser for excitation precisely. This makes it possible to eliminate a Peltier element, and reduce the power consumption.

Moreover, the laser light source device has a high efficiency, thereby enabling to decrease the power consumption further.

In the laser light source device, it may be preferable that light energy of the residual excitation light in the double-clad fiber is converted into thermal energy.

According to this configuration, the light energy of the residual excitation light in the double-clad fiber is converted into thermal energy. Accordingly, the light energy of the residual excitation can be radiated as heat. This helps prevent divergent light from deteriorating peripheral components.

In the laser light source device, it may be preferable that residual excitation light in the double-clad fiber is reflected without exiting to the single-mode fiber.

According to this configuration, residual excitation light in the double-clad fiber returns to the double-clad fiber. Therefore, in the double-clad fiber, oscillation light can be obtained more efficiently (at a higher light-light conversion efficiency) from the excitation light.

In the laser light source device, it may be preferable that an oscillation wavelength of the laser light source is within a range of 900 to 950 nm.

According to this configuration, even if the excitation light wavelength of the laser light source varies as the temperature changes, the absorption of excitation light in the double-clad fiber can be suppressed to a smaller variation. Hence, there is no need to manage the temperature of the laser light source with high precision. Accordingly, the cooling mechanism of the laser light source can be made simpler.

In the laser light source device, it may be preferable that the double-clad fiber is a polarization maintaining fiber.

According to this configuration, laser light having a specific polarization direction can be generated. Therefore, this makes it possible to generate laser light which is suitable for an image display apparatus requiring a single polarization.

In the laser light source device, it may be preferable that the single-mode fiber includes a coil-shaped portion which has no coating and a predetermined curvature radius; and residual excitation light in the double-clad fiber radiate from the coil-shaped portion.

According to this configuration, residual excitation light in the double-clad fiber can be efficiently radiated using the radiation of light from the coil-shaped portion.

In the laser light source device, it may be preferable that the coil-shaped portion is molded by a coating member made of a material having a refractive index of 1.5 or more.

According to this configuration, a difference in refractive index between the coil-shaped portion and its periphery becomes smaller. Therefore, residual excitation light can be efficiently radiated from the coil-shaped portion.

In the laser light source device, it may be preferable that the coating member is made of resin.

According to this configuration, the coil-shaped portion can be molded and buried easily in the coating member.

In the laser light source device, it may be preferable to further provide a residual excitation light processing portion between the double-clad fiber and the single-mode fiber to thereby prevent residual excitation light in the double-clad fiber into which the excitation light has been allowed to fall from the laser light source from exiting to the single-mode fiber.

According to this configuration, it is possible to separately provide the residual excitation light processing portion which prevents residual excitation light in the double-clad fiber into which the excitation light has been allowed to fall from the laser light source from exiting to the single-mode fiber.

In the laser light source device, it may be preferable that the residual excitation light processing portion absorbs residual excitation light in the double-clad fiber based on a chromatic aberration between the residual excitation light in the double-clad fiber and the oscillation light in the double-clad fiber.

According to this configuration, residual excitation light in the double-clad fiber can be eliminated, and only oscillation light in the double-clad fiber can be emitted to the single-mode fiber.

In the laser light source device, it may be preferable that the residual excitation light processing portion includes an optical system which guides laser light exiting from the double-clad fiber to the single-mode fiber; and the optical system includes a reflecting member provided on a path of laser light exiting from the double-clad fiber to thereby reflect the residual excitation light in the double-clad fiber and transmit oscillation light in the double-clad fiber.

According to this configuration, residual excitation light in the double-clad fiber can be reflected and only the oscillation light in the double-clad fiber can be transmitted. This makes it possible to emit only the oscillation light in the double-clad fiber to the single-mode fiber.

In the laser light source device, it may be preferable that the residual excitation light processing portion includes an optical system which guides laser light exiting from the double-clad fiber to the single-mode fiber; and the optical system includes a reflecting member provided on a lens disposed on a path of laser light exiting from the double-clad fiber to thereby reflect the residual excitation light in the double-clad fiber and transmit the oscillation light in the double-clad fiber.

According to this configuration, the residual excitation light in the double-clad fiber can be reflected and only oscillation light in the double-clad fiber can be transmitted. This makes it possible to emit only the oscillation light in the double-clad fiber to the single-mode fiber. Besides, the reflecting member is provided on the lens. Accordingly, positioning of the reflected residual excitation light and the double-clad fiber can be easily accomplished.

In the laser light source device, it may be preferable that the residual excitation light processing portion include an optical system which guides laser light exiting from the double-clad fiber to the single-mode fiber; and a reflecting member provided at the end of the double-clad fiber that faces the optical system, thereby reflecting the residual excitation light in the double-clad fiber and transmitting the oscillation light in the double-clad fiber.

According to this configuration, the residual excitation light in the double-clad fiber can be reflected and only the oscillation light in the double-clad fiber can be transmitted. This makes it possible to emit only the oscillation light in the double-clad fiber to the single-mode fiber. Besides, the reflecting member is provided at the end of the double-clad fiber. Accordingly, positioning of the reflected residual excitation light and the double-clad fiber can be easily accomplished.

In the laser light source device, it may be preferable that the double-clad fiber is formed with a fiber grating for reflecting the residual excitation light in the double-clad fiber and transmitting the oscillation light in the double-clad fiber.

According to this configuration, the residual excitation light in the double-clad fiber can be reflected without exiting temporarily into space. This helps restrain a loss in the output of residual excitation light each reflection.

In the laser light source device, it may be preferable that the fiber gratings include a wide band fiber grating on the side facing the laser light source and a narrow band fiber grating on the side facing the wavelength conversion module; and the laser light source, the coil-shaped portion, or/and the residual excitation light processing portion is located above the narrow band fiber grating inside of a housing accommodating the laser light source device.

According to this configuration, the narrow band fiber grating can be kept apart from the laser light source, the coil-shaped portion and the residual excitation light processing portion which are a heat source. This makes it possible to prevent the narrow band fiber grating from causing a wavelength variation due to a change in the temperature.

In the laser light source device, it may be preferable that the fiber gratings include a wide band fiber grating on the side facing the laser light source and a narrow band fiber grating on the side facing the wavelength conversion module; and the narrow band fiber grating is located outside of a housing accommodating the laser light source device.

According to this configuration, the narrow band fiber grating can be kept far away from the laser light source, the coil-shaped portion and the residual excitation light processing portion which is a heat source. This can greatly keep the narrow band fiber grating from causing a wavelength variation due to a change in the temperature.

In the laser light source device, it may be preferable that the fiber gratings include a wide band fiber grating on the side facing the laser light source and a narrow band fiber grating on the side facing the wavelength conversion module; and the narrow band fiber grating is located inside of a housing accommodating the laser light source device, and the narrow band fiber grating include a temperature compensating portion for compensating for the temperature of the narrow band fiber grating.

According to this configuration, the temperature of the narrow band fiber grating can be precisely managed. This can prevent the narrow band fiber grating from causing a wavelength variation due to a change in the temperature.

In the laser light source device, it may be preferable that the wavelength conversion module includes a second harmonic generation module which outputs light having a wavelength of a half of the wavelength of the oscillation light in the double-clad fiber.

According to this configuration, from the oscillation light in the double-clad fiber, a harmonic having a wavelength of a half wavelength of the oscillation light can be further obtained.

In the laser light source device, it may be preferable that the wavelength of the oscillation light in the double-clad fiber is 1030 to 1070 nm and the wavelength of the harmonic of the wavelength conversion module is 515 to 535 nm.

According to this configuration, light having a wavelength of 515 to 535 nm can be obtained which is usable as a green light source for image display apparatus such as a laser display apparatus.

In the laser light source device, it may be preferable that the output of excitation light from the laser light source is 20 to 25 W, and the wavelength of the oscillation light in the double-clad fiber is 1030 to 1070 nm.

According to this configuration, light having a wavelength of 515 to 535 nm can be obtained which is usable as a green light source for image display apparatus such as a laser display apparatus.

An image display apparatus according to the present invention includes the above-mentioned laser light source device, and a display portion for displaying an image using laser light emitted from the laser light source device.

This image display apparatus can widen the range of color reproduction.

INDUSTRIAL APPLICABILITY

According to the present invention, deterioration of a fiber in a fiber laser light source, particularly, in a fiber laser light source operable to emit linearly-polarized light having a wavelength of 1070 nm or less, due to residual excitation light can be prevented to thereby raise the reliability. Also, the output of oscillation light can be increased because of no limitation of output of excitation light. Further, a light source device having a combination of this fiber laser light source and a wavelength conversion module can be used to a laser display apparatus or the like which needs a higher brightness and a larger size than ever, as well as a high color reproducibility.

The invention claimed is:

1. A laser light source device comprising:
   a double-clad fiber added with a rare earth as a laser active material;
   a laser light source for emitting excitation light to the double-clad fiber to excite the double-clad fiber;
   a set of fiber gratings for determining a wavelength of oscillation light in the double-clad fiber;
   a single-mode fiber for propagating oscillation light in the double-clad fiber; and
   a wavelength conversion module for converting oscillation light in the double-clad fiber into a harmonic,
   wherein residual excitation light in the double-clad fiber into which the excitation light has been allowed to fall from the laser light source is prevented from exiting to the single-mode fiber.

2. The laser light source device according to claim 1, wherein light energy of the residual excitation light in the double-clad fiber is converted into thermal energy.

3. The laser light source device according to claim 1, wherein the residual excitation light in the double-clad fiber is reflected without exiting to the single-mode fiber.

4. The laser light source device according to claim 1, wherein an oscillation wavelength of the laser light source is within a range of 900 to 950 nm.

5. The laser light source device according to claim 1, wherein the double-clad fiber is a polarization maintaining fiber.

6. The laser light source device according to claim 1, wherein:
the single-mode fiber includes a coil-shaped portion having a predetermined curvature radius and having no coating; and
the residual excitation light in the double-clad fiber radiates from the coil-shaped portion.

7. The laser light source device according to claim 6, wherein the coil-shaped portion is molded by a coating member made of a material having a refractive index of 1.5 or more.

8. The laser light source device according to claim 7, wherein the coating member is made of resin.

9. The laser light source device according to claim 1, further comprising a residual excitation light processing portion which is disposed between the double-clad fiber and the single-mode fiber, and prevents residual excitation light in the double-clad fiber into which the excitation light has been allowed to fall from the laser light source from exiting to the single-mode fiber.

10. The laser light source device according to claim 9, wherein the residual excitation light processing portion absorbs the residual excitation light in the double-clad fiber based on a chromatic aberration between the residual excitation light in the double-clad fiber and the oscillation light in the double-clad fiber.

11. The laser light source device according to claim 9, wherein:
the residual excitation light processing portion includes an optical system which guides laser light exiting from the double-clad fiber to the single-mode fiber; and
the optical system includes a reflecting member provided on a path of laser light exiting from the double-clad fiber to thereby reflect the residual excitation light in the double-clad fiber and transmit the oscillation light in the double-clad fiber.

12. The laser light source device according to claim 9, wherein:
the residual excitation light processing portion includes an optical system which guides laser light exiting from the double-clad fiber to the single-mode fiber; and
the optical system includes a reflecting member provided on a lens disposed on a path of laser light exiting from the double-clad fiber to thereby reflect the residual excitation light in the double-clad fiber and transmit the oscillation light in the double-clad fiber.

13. The laser light source device according to claim 9, wherein:
the residual excitation light processing portion includes an optical system which guides laser light exiting from the double-clad fiber to the single-mode fiber; and
a reflecting member provided at an end of the double-clad fiber to thereby reflect the residual excitation light in the double-clad fiber and transmit the oscillation light in the double-clad fiber, the end facing the optical system.

14. The laser light source device according to claim 1, wherein the double-clad fiber is formed with a fiber grating for reflecting the residual excitation light in the double-clad fiber and transmitting the oscillation light in the double-clad fiber.

15. The laser light source device according to claim 6, wherein:
the fiber gratings include a wide band fiber grating on the side facing the laser light source and a narrow band fiber grating on the side facing the wavelength conversion module; and
at least one of the laser light source and the coil-shaped portion is located above the narrow band fiber grating inside of a housing accommodating the laser light source device.

16. The laser light source device according to claim 9, wherein:
the fiber gratings include a wide band fiber grating on the side facing the laser light source and a narrow band fiber grating on the side facing the wavelength conversion module; and
at least one of the laser light source and the residual excitation light processing portion is located above the narrow band fiber grating inside of a housing accommodating the laser light source device.

17. The laser light source device according to claim 1, wherein:
the fiber gratings include a wide band fiber grating on the side facing the laser light source and a narrow band fiber grating on the side facing the wavelength conversion module; and
the narrow band fiber grating is located outside of a housing accommodating the laser light source device.

18. The laser light source device according to claim 1, wherein:
the fiber gratings include a wide band fiber grating on the side facing the laser light source and a narrow band fiber grating on the side facing the wavelength conversion module; and
the narrow band fiber grating is located inside of a housing accommodating the laser light source device, and the narrow band fiber grating includes a temperature compensating portion for compensating for the temperature of the narrow band fiber grating.

19. The laser light source device according to claim 1, wherein the wavelength conversion module includes a second harmonic generation module which outputs light having a wavelength of a half of the wavelength of the oscillation light in the double-clad fiber.

20. The laser light source device according to claim 1, wherein a wavelength of the oscillation light in the double-clad fiber is 1030 to 1070 nm and a wavelength of a harmonic of the wavelength conversion module is 515 to 535 nm.

21. The laser light source device according to claim 1, wherein the output of excitation light from the laser light source is 20 to 25 W and a wavelength of the oscillation light in the double-clad fiber is 1030 to 1070 nm.

22. An image display apparatus, comprising:
the laser light source device according to claim 1; and
a display portion for displaying an image using laser light emitted from the laser light source device.

* * * * *